Sept. 3, 1968  E. E. HÄRTL ET AL  3,399,422
FISH TREATING PROCESS AND APPARATUS
Original Filed Jan. 18, 1965  13 Sheets-Sheet 1

INVENTORS
ERNST HÄRTL et al

Sept. 3, 1968 E. E. HÄRTL ET AL 3,399,422
FISH TREATING PROCESS AND APPARATUS
Original Filed Jan. 18, 1965          13 Sheets-Sheet 2

INVENTORS
ERNST HÄRTL et al

INVENTOR.
ERNST HÄRTL et al

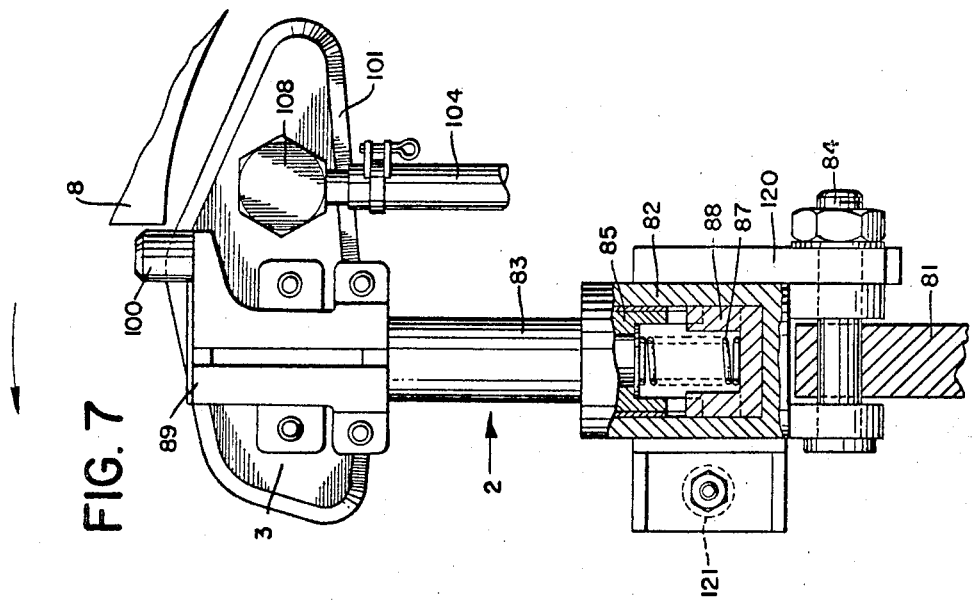
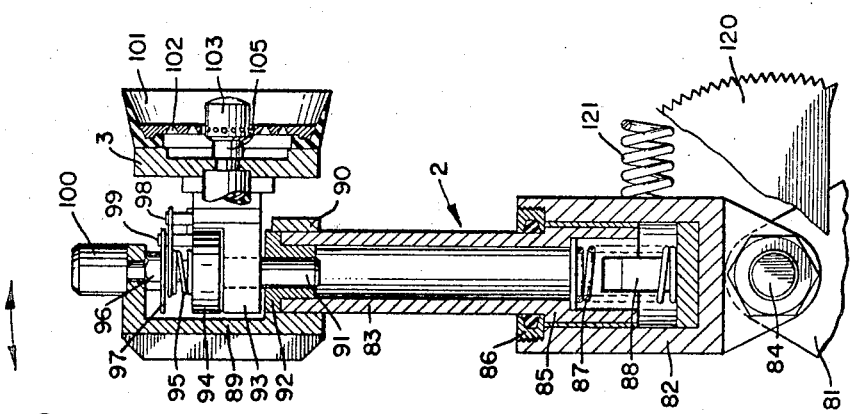

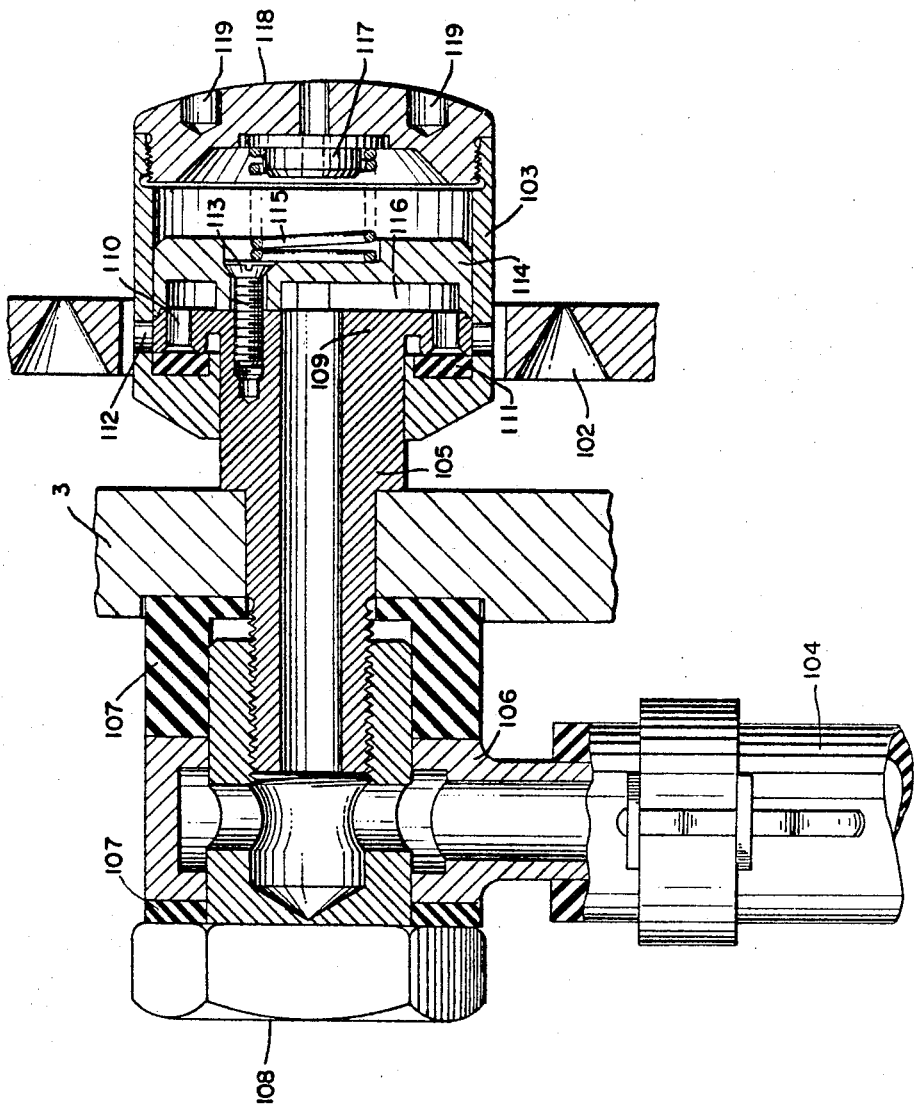

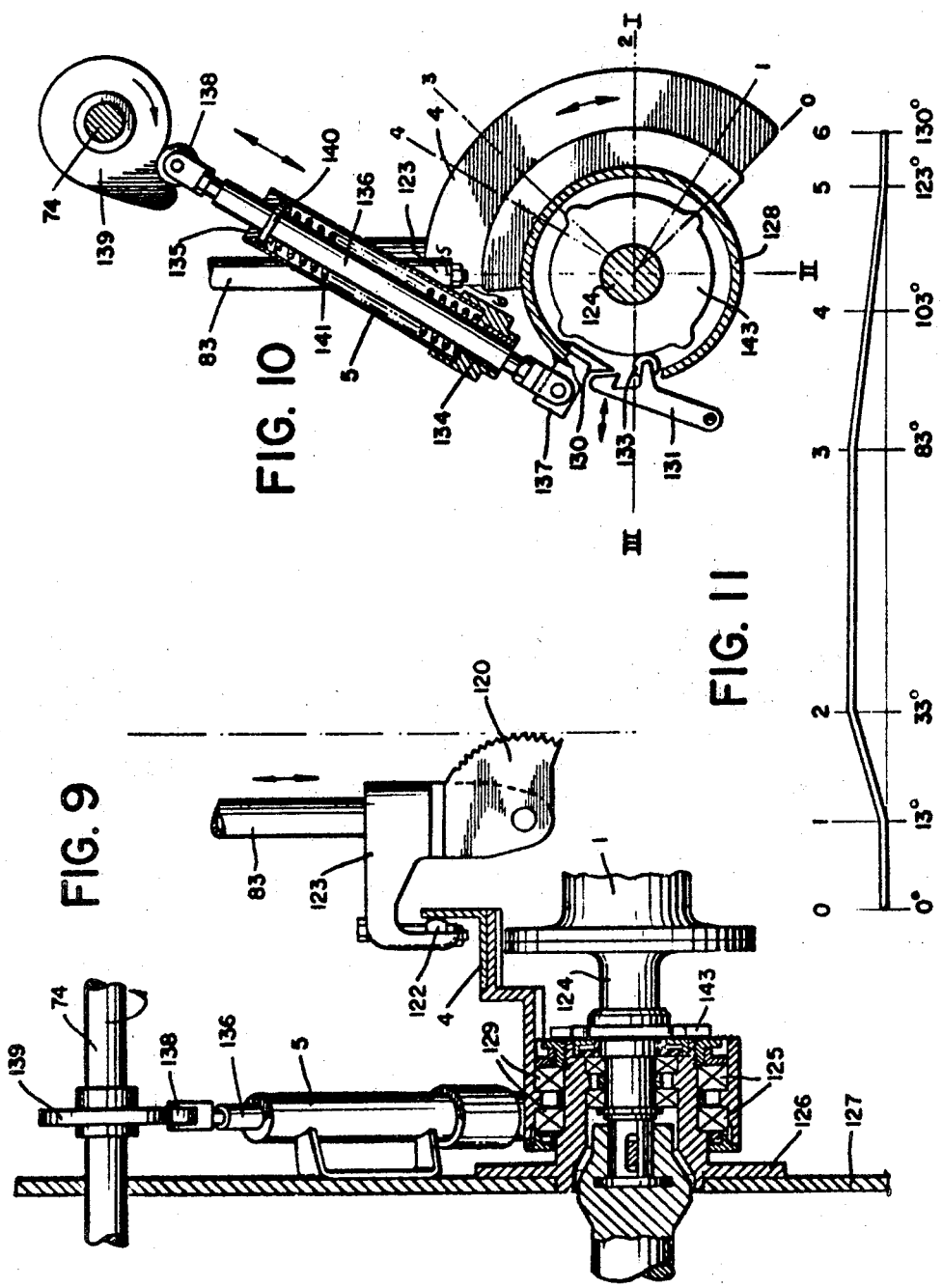

INVENTOR.
ERNST HÄRTL et al

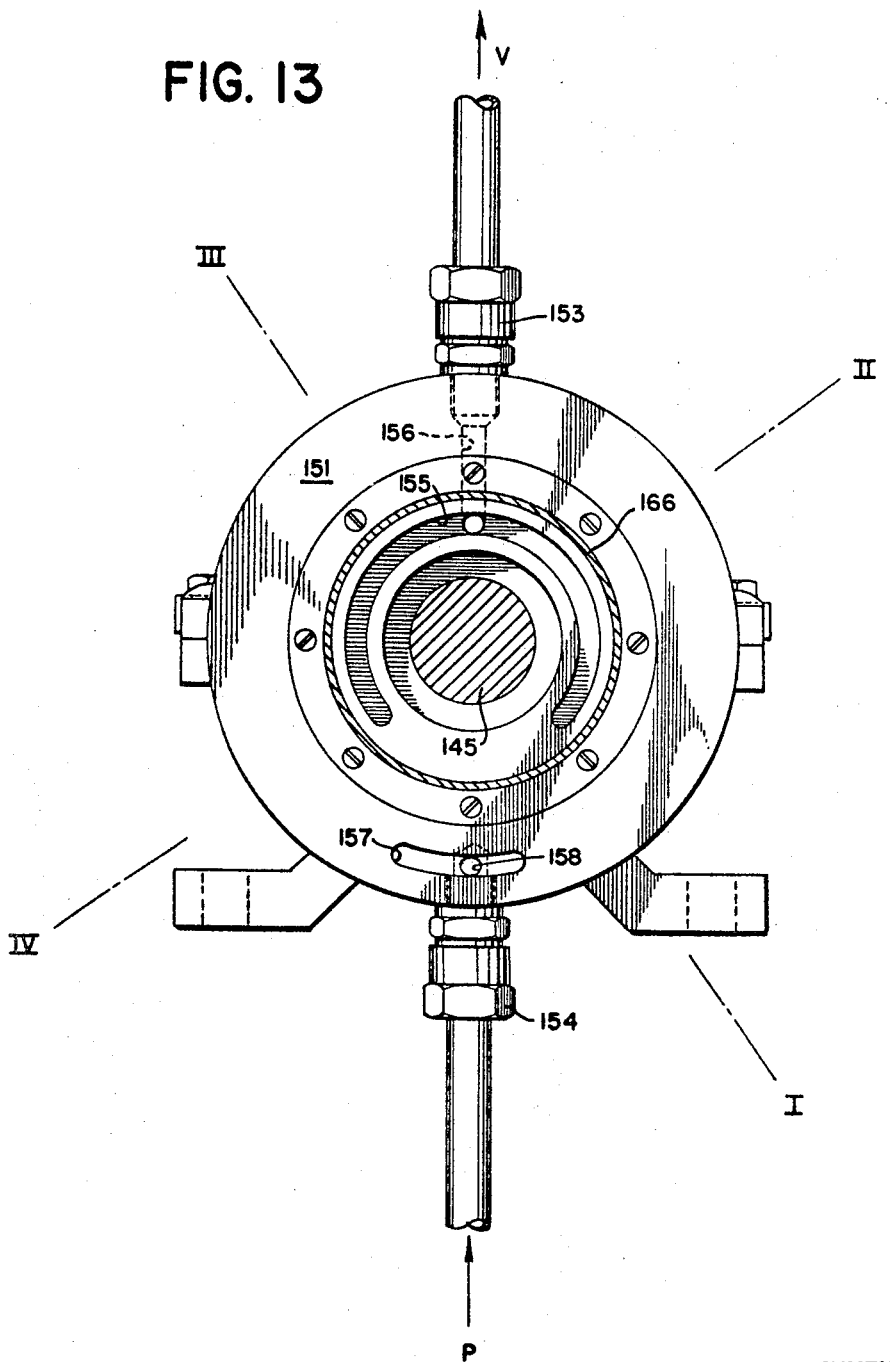

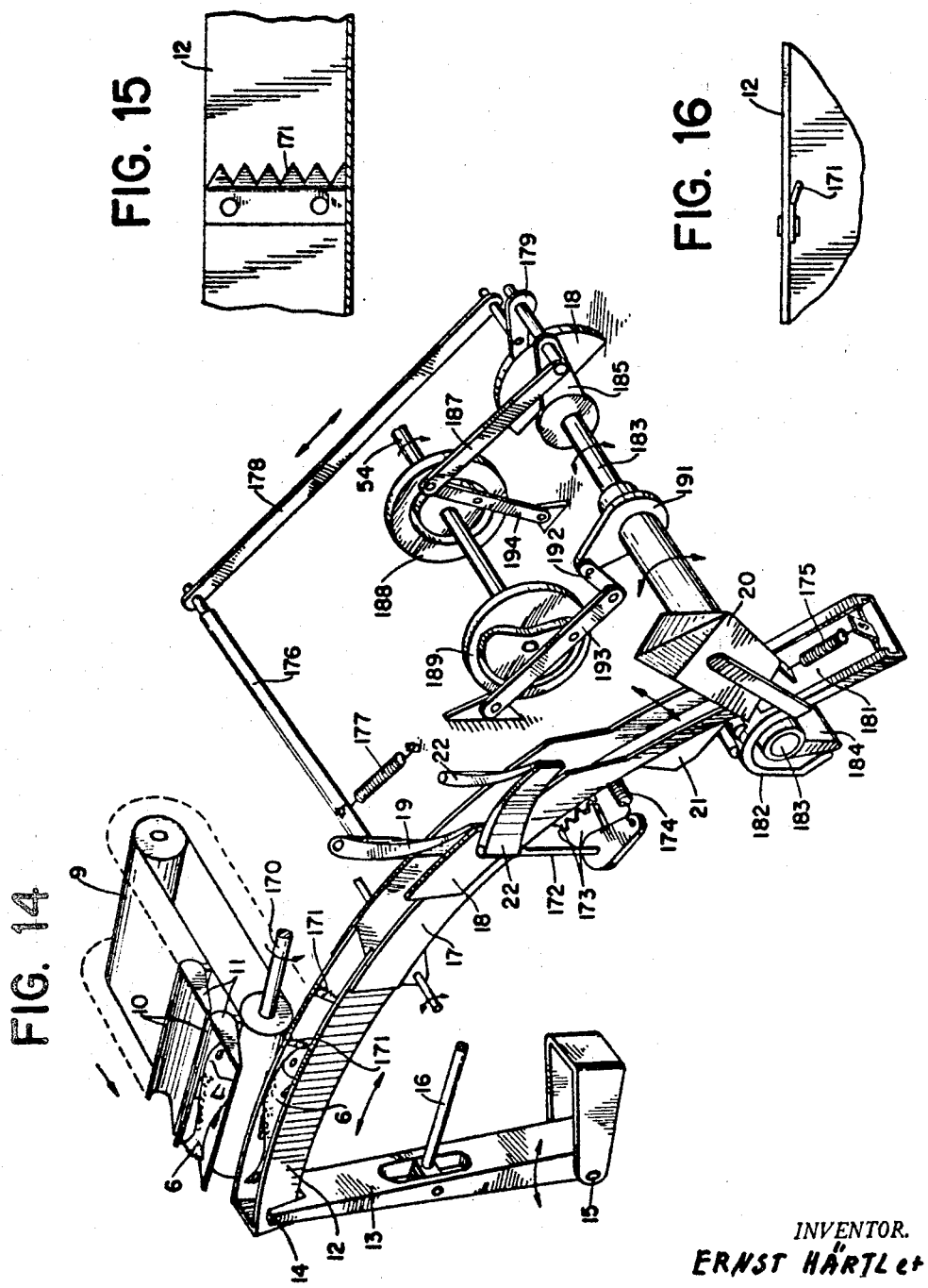

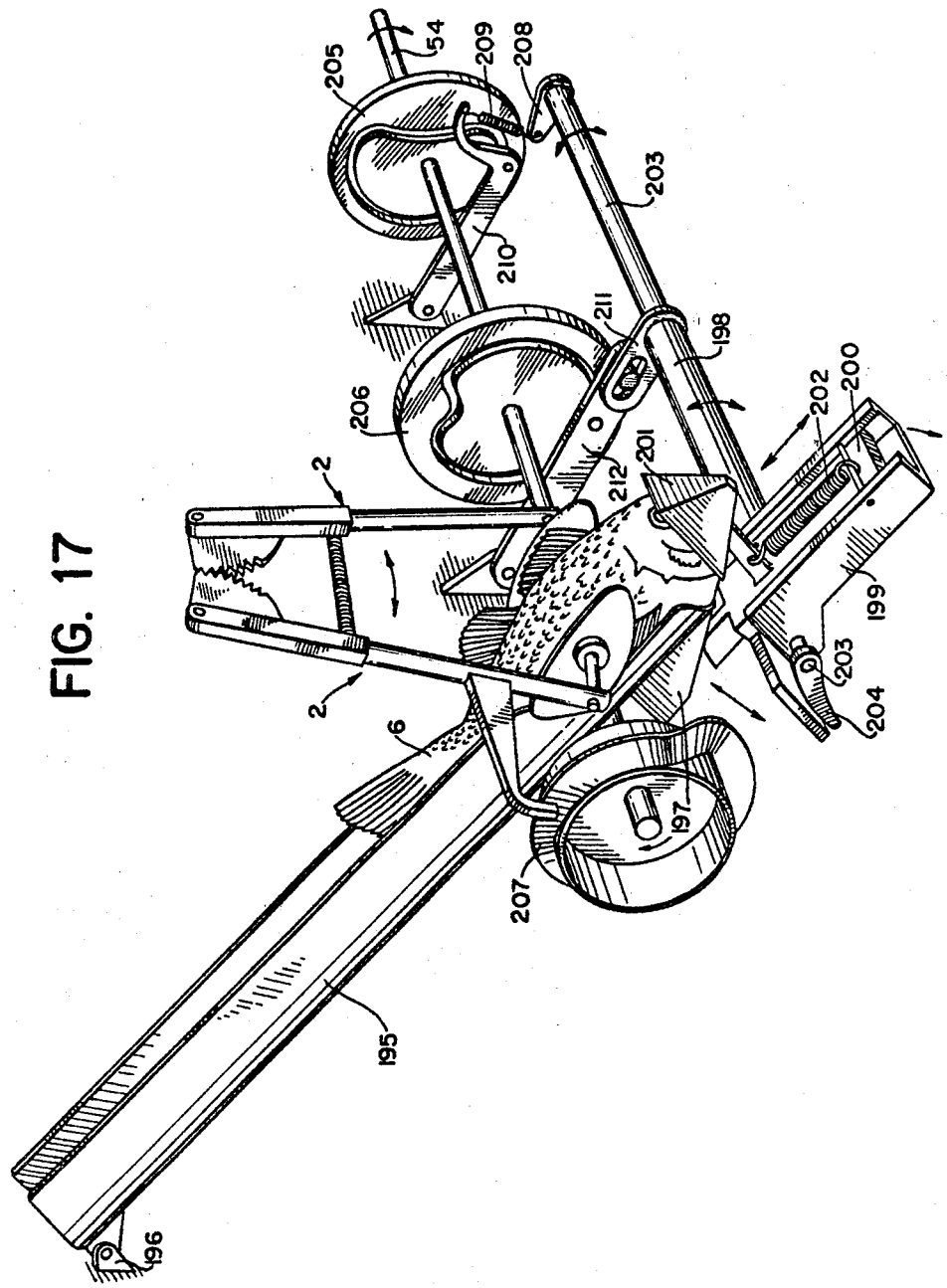

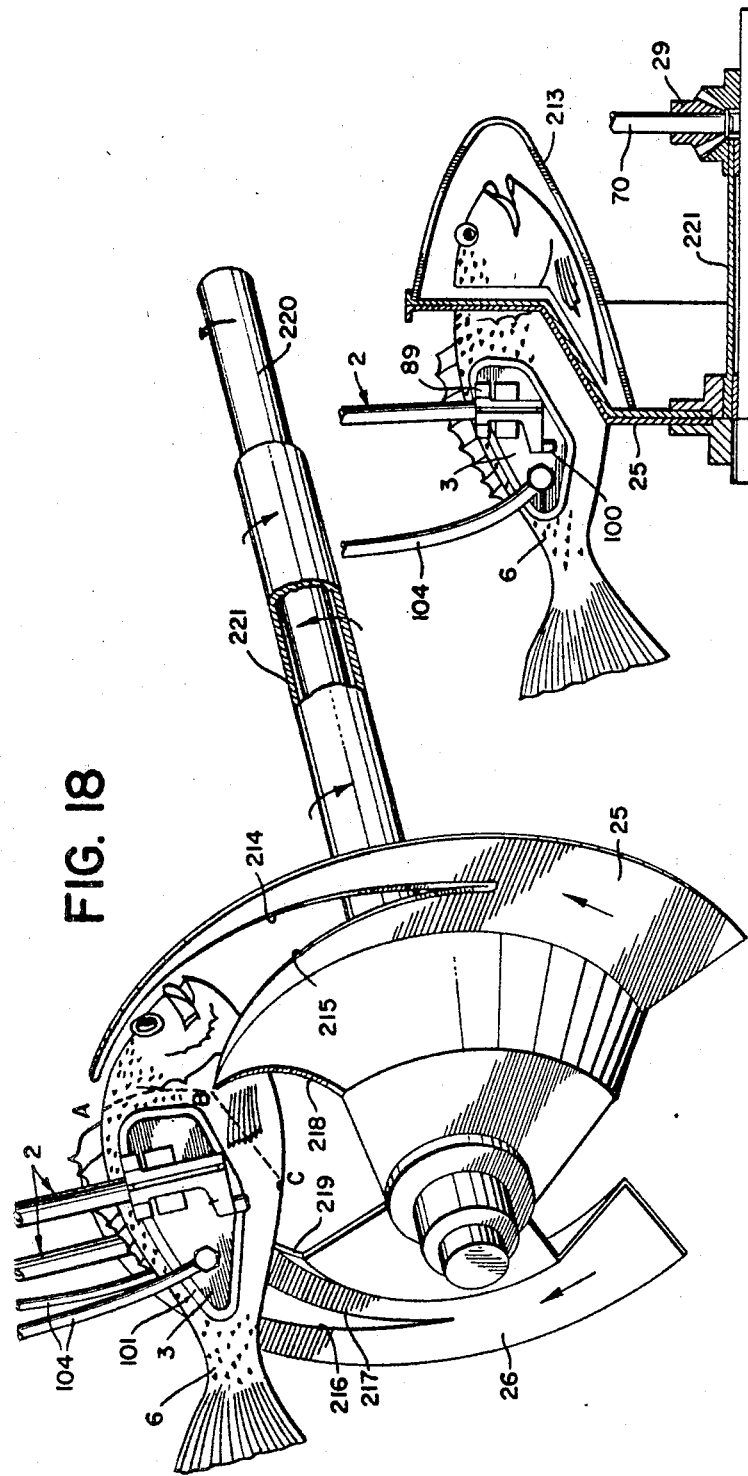

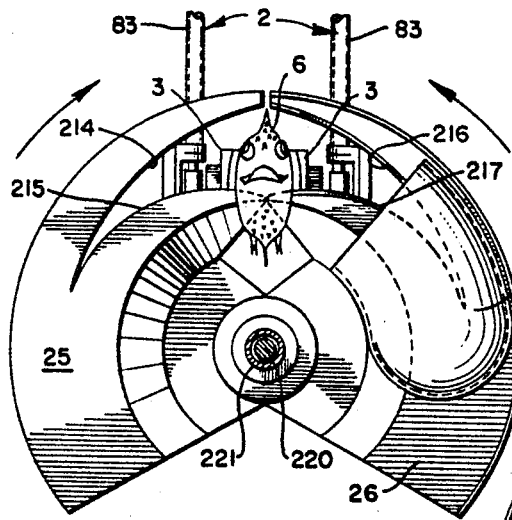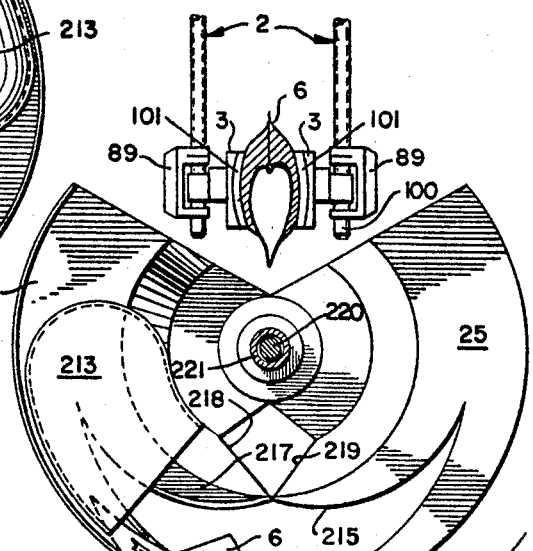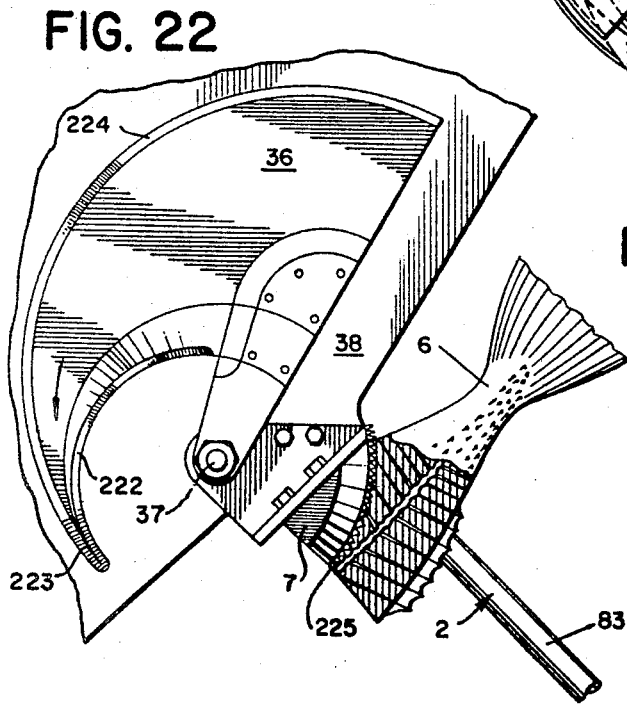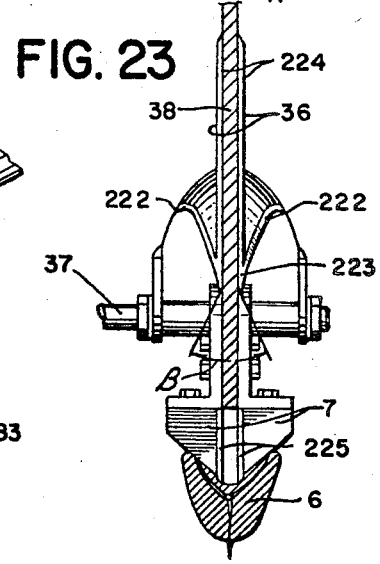
FIG. 20
FIG. 21
FIG. 22
FIG. 23

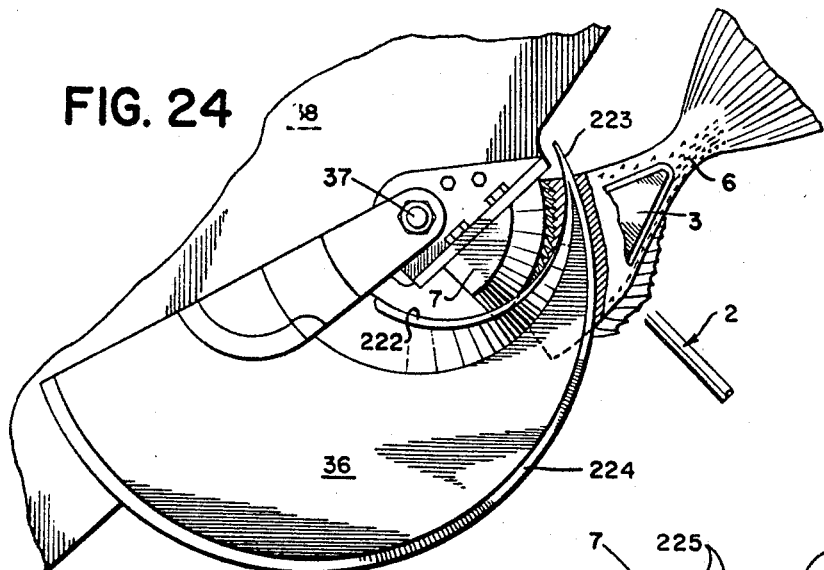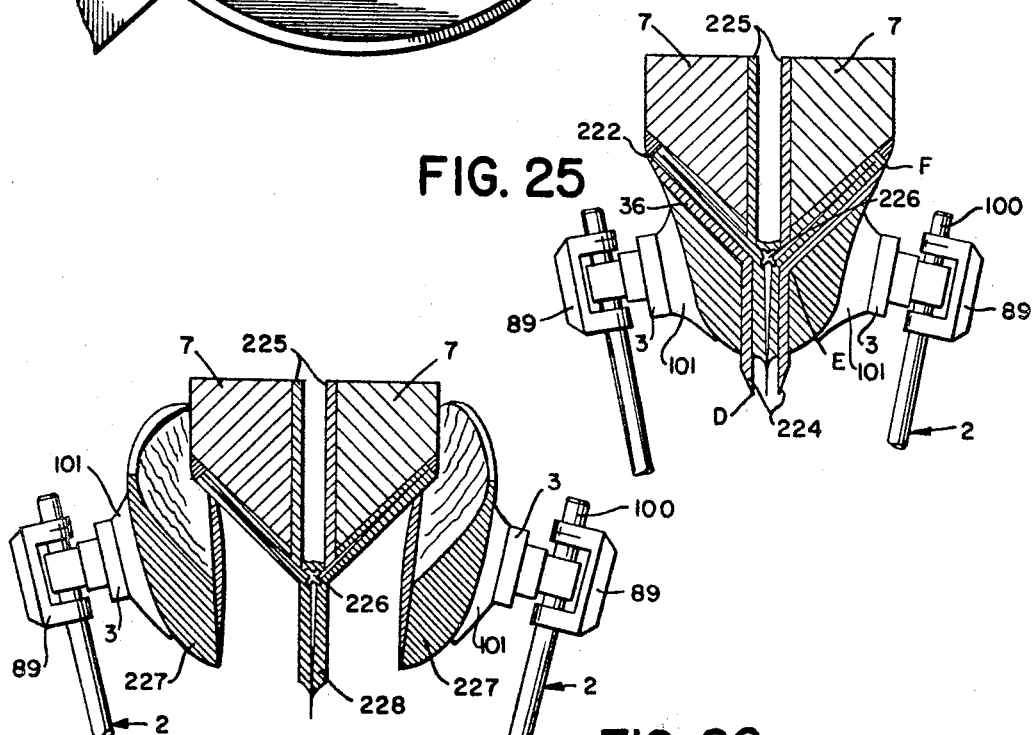

United States Patent Office 3,399,422
Patented Sept. 3, 1968

3,399,422
FISH TREATING PROCESS AND APPARATUS
Ernst Eduard Hartl, Alfred Albert Dudszus, Reinhold Heinrich Franz, Christoph Fredrich Wilhelm Rethfeldt, Gunther Hubert Reiner Wienert, Rudolf Muke, Franz Andreas Hauptmann, and Gunther Bolze, Rostock, Germany, assignors to Institut fur Schiffbau, Rostock, Germany
Original application Jan. 18, 1965, Ser. No. 426,055. Divided and this application Feb. 16, 1966, Ser. No. 565,661
8 Claims. (Cl. 17—3)

ABSTRACT OF THE DISCLOSURE

Structure for cutting away the head and stomach of the fish as well as for filleting the fish while removing the spine and ribs thereof, comprising: means for supporting a fish for movement in a predetermined path; first cutting means adjacent this path for removing the head and stomach, a second means for filleting the fish comprising a pair of sector blades which rotate simultaneously to engage the fish as the latter approaches this second means and are adapted to remove the spine and rib bones from the fish.

---

This is a division of application Ser. No. 426,055, filed Jan. 18, 1965, and entitled "Fish Treating Process and Apparatus," now abandoned.

The present invention relates to the treatment of fish.

In particular, the present invention relates to a process and apparatus for treating fish subsequent to the catching thereof in preparation for the marketing of the fish.

During recent times it has become customary for fishing vessels to travel to considerable distances in order to catch fish, and these long trips have created various problems. The travel on longer trips of course carries with it an extra cost which is not directly attributable to the cost of the fish.

Furthermore, once the fish are caught it is of course necessary for them to be transported with the vessel. If the fish are simply caught and stored on board ship while they are transported back to a suitable port, then, since approximately only 34% of a fish can be used either for food or for other purposes, and the waste cannot be used except to an extremely small extent for products such as fish meal, it becomes clear that a considerable part of the transportation cost is devoted simply to transporting waste. This problem becomes aggravated on a relatively long voyage. Therefore, in order to make better use of the available tonnage which can be carried on board ship, it is essential to separate the useful from the non-useful part of the catch substantially immediately after the fish are caught. As a result, it becomes essential to treat the fish on board ship in order to use the available tonnage solely for the transportation of useful fish parts which will bring in some sort of financial return.

Besides making better use of the available transportation space on board ship, the treatment of the fish substantially immediately after the catching thereof is of further advantage because it is possible to achieve fish of far better quality by cutting away the waste portions as soon as possible after the fish are caught. Thus, by immediately treating a fish after it is caught so as to separate the waste from the remainder of the fish, the plant which is necessary to keep the fish fresh works only on useful fish parts which can be sold and is not required also to maintain waste in a fresh condition.

Thus, with an arrangement where only the useful parts of the fish are retained and kept fresh, it is possible when reaching port to immediately pack the finished product as soon as the load is transferred from the ship onto land. As a result the edible parts of the fish reach the ultimate consumer in a lesser time, since the time required from the reaching of port until the fish reaches the ultimate consumer is reduced to a minimum, and, as a result, the consumer receives a product of higher quality. Of course, the higher quality product results in higher prices, so that from this standpoint also a better financial result is achieved. At the same time the cost for maintaining a unit of weight of the fish fresh is lower because of the fact that the entire product which is maintained fresh is edible and capable of being sold.

The working of fish on board ship requires a quick and continuous treatment of the fish while at the same time the process and apparatus must be adapted to the relatively rough requirements of handling the fish at sea. These requirements are best fulfilled by providing a mechanical handling of the fish which is as automatic as possible.

However, in order to make the best possible use of the available space and tonnage on board ship, it is necessary to fulfill further requirements. Thus, the fish-treating machinery must be as light as possible while at the same time occupying a minimum amount of space. Up to the present time, the fish treating machinery which has been used on board ship has been the very same machinery which is used on land for treating fish. However since such machinery is designed primarily for use on land, it is far too heavy and occupies far too much space in order to achieve on board ship a treatment of the fish which is as economical as possible.

Of course, various problems are encountered in the use of such machinery. Thus, it is essential to keep a fish moving from one operating station to the next, so that a series of fish are treated rapidly one after the other to achieve a high output. Furthermore, when the fish is cut, for example, so as to remove the head thereof, it is essential to cut the fish in such a way that while the waste is fully removed at the same time a minimum amount of useful meat is removed with the waste. This requirement of precisely cutting the fish so as to eliminate only the waste and not the useful parts thereof represents a particularly difficult problem because it is necessary to position the fish very accurately while performing cutting operations thereon. After the head is removed it is of course necessary to remove the stomach portions of the fish and to clean the fish. Then it should be fileted. When dealing with a product such as a slippery wet fish, the size of which can change considerably from one fish to the next, considerable problems are encountered in providing the most economical operations which will achieve a maximum amount of useful material while reliably eliminating the waste.

At the present time, known machines for positioning a fish and for performing cutting operations thereon are extremely complex and expensive. Furthermore, the efficiency with which the operations are performed is influenced by the condition of the fish. A freshly caught fish has firm flesh and its outer skin is quite firm, whereas a fish which has been out of the water for a substantial period of time is soft and slippery. Its skin slides easily with respect to the flesh therebeneath so that the proper treatment of such a fish is far more difficult to carry out.

Of course, carrying out more or less continuous adjustments in order to take care of differences between the sizes and conditions of successive fish is an extremely expensive proposition not only from the standpoint of machinery but from also the standpoint of personnel. The different fish are not only of different lengths and different heights they are also different thicknesses, and it is an extremely difficult matter to treat the fish in such a way that not only is there a maximum amount of useful flesh derived from the fish but in addition this flesh is in top condition with a minimum of injury thereto. The pressures applied to the fish by various devices which transport the fish and which hold the fish for the operations thereon tend to reduce the quality of the flesh which is ultimately achieved from the fish. Furthermore, when a fish is held by a device such as a hook, for example, there is an absolute damaging of useful parts of the fish which render the waste portion undesirably great.

It is accordingly a primary object of the present invention to provide a process and apparatus which make it possible to treat a fish very economically almost immediately after it is caught so as to efficiently remove from the fish the waste portions while retaining the useful portions which can be stored on board ship.

A particular object of the present invention is to provide a fish-treating apparatus which will occupy only a relatively small amount of space so that it can be accommodated with ease on board ship, while at the same time the weight of the structure of the invention is quite low so as to increase the available tonnage and thus increase the proportion of the available tonnage which can be used for the transportation of saleable fish.

Furthermore, it is an object of the invention to provide a process and apparatus which enable steps which heretofore have required separate operations and separate structures to be combined into a single operation.

In addition, it is an object of the invention to provide an apparatus which requires a very small amount of maintenance and which eliminates the necessity for personnel who must constantly watch all operations and must constantly carry out adjustments, so that in this way the economy of the entire operation is very greatly increased with the structure of the invention.

Furthermore, it is an object of the present invention to provide a process and apparatus which will provide practically no injury to the useful flesh which is retained, so that this flesh of the fish is at the peak of its quality as a result of the process and apparatus of the invention.

It is in particular an object of the invention to provide a process and apparatus which will accomplish the above objects in order to achieve a filet which is useful in its entirety, while all the rest of the waste portions can be eliminated from the ship at sea.

A further object of the invention is to provide a process and apparatus which, while requiring a minimum amount of space on board ship and while being of relatively light-weight, nevertheless is capable of achieving a very high output so that a large number of fish can be treated one after the other in a minimum amount of time with the process and apparatus of the invention.

Furthermore, it is an object of the invention to provide an apparatus which is rugged enough to withstand relatively rough operating conditions encountered at sea while at the same time continuing to operate reliably over a long period of time.

Primarily, with the structure of the invention, as well as with the process thereof, the head and stomach of a fish are eliminated from the body thereof in a single operation so that thereafter, the fish being properly cleaned, filet portions of the fish can be removed leaving only the spine and rib portions to be eliminated as waste.

The fileting of the fish also takes place in a single operation, and the process and apparatus of the invention provide automatic transportation of the fish, after automatically adjusting the apparatus to the size of the fish, from one station to the next where the several operations are performed.

The invention is illustrated by way of example in the accompanying drawings which form part of the application and in which:

FIG. 2 is a diagram showing the sequence and durations of the various operations which take place during one complete cycle;

FIG. 3 is a partly schematic side elevation of the driving structure of the invention;

FIG. 6 is a longitudinal sectional elevation of a gripping arm together with a fish-engaging means carried thereby;

FIG. 7 is a partly sectional side view of the structure of FIG. 6;

FIG. 8 is a longitudinal sectional elevation of an air valve of the invention used with the fish-engaging structure;

FIG. 9 is a sectional fragmentary schematic illustration of the structure for controlling the movement of a pair of fish gripping arms of the invention with respect to each other;

FIG. 10 is a sectional elevation showing that part of the structure which controls the movement of a pair of gripping arms with respect to each other;

FIG. 11 is a development of a cam used for the controls of FIGS. 9 and 10;

FIG. 13 is a transverse section of the structure of FIG. 12 taken along line 13—13 of FIG. 12 in the direction of the arrows;

FIG. 14 is a schematic perspective illustration of one possible embodiment of a structure of the invention for guiding and positioning the fish in preparation for transportation thereof to the various treating stations of the invention;

FIG. 15 is a fragmentary side view of a fish-transporting trough showing teeth which engage the exterior of the fish;

FIG. 16 is a top plan view of the structure of FIG. 15;

FIG. 17 is a partly schematic perspective illustration of another embodiment of a structure for guiding and positioning a fish in preparation for transportation thereto the various operating stations of the invention;

FIG. 18 is a perspective illustration of the structure and process of the invention for simultaneously removing the head and stomach of a fish;

FIG. 19 is a sectional side view of the structure of FIG. 18 illustrating in particular the manner in which the waste portions of the fish are retrieved;

FIG. 20 is an end view of the structure of FIGS. 18 and 19 showing the configuration of the cutting edges of the blades;

FIG. 21 is a view similar to FIG. 20 but showing a subsequent part of the operating cycle, FIG. 21 illustrating in particular how the waste is eliminated;

FIG. 22 is a side elevation of the fileting structure of the invention;

FIG. 23 is an end view of the structure of FIG. 22 as seen from the left of FIG. 22;

FIG. 24 illustrates the process and apparatus for fileting, the illustration being shown in a side elevation in FIG. 24;

FIG. 25 is a transverse view of the structure of FIG. 24 showing the manner in which the fileting blades cut through the flesh; and FIG. 26 illustrates the separating of the fileted fish portions from the bone-containing parts which remain and which are thereafter eliminated as waste.

General layout

Figure 1:
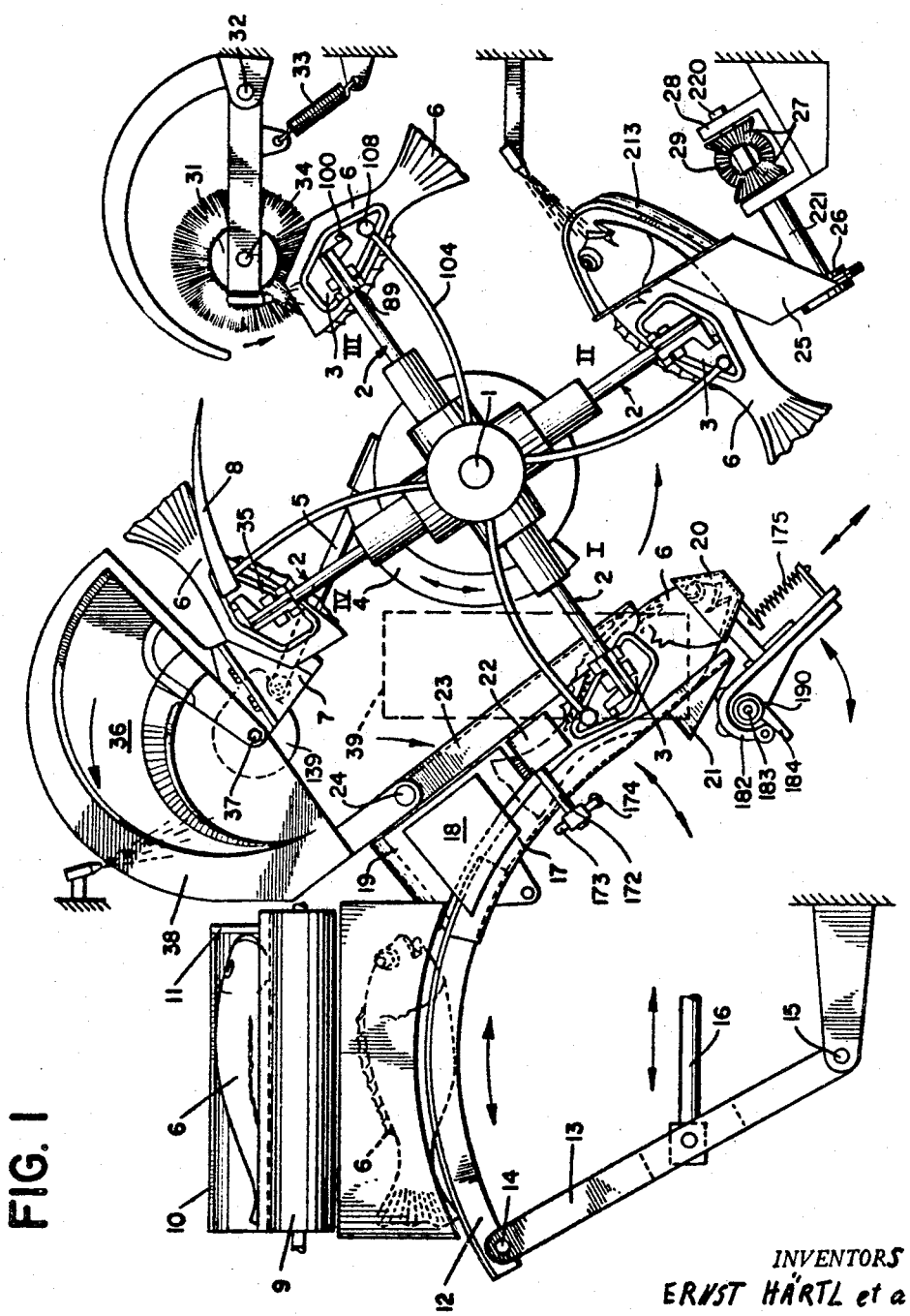
FIG. 1 is a schematic illustration of the apparatus of the invention showing how the various components are arranged so as to treat a fish at various operating stations.

FIG. 1 illustrates the entire organization of the process and apparatus of the invention. Various details such as those of the supporting structure, the driving structure, as well as the controlling structure are not shown in FIG. 1. Those details which are essential for an understanding of the invention will be described below in connection with the remaining figures.

The machine of the invention includes a main drive shaft 1 which is flanged between a pair of coaxial supporting shafts which are supported for rotation in suitable bearings, as will be apparent from the description below. These coaxial supporting shafts which are respectively connected to the ends of the main shaft 1 are not shown in FIG. 1, but they serve to support the shaft 1 for rotary movement. In the illustrated example, the shaft 1 carries four pairs of fish-gripping arm means 2, each pair of arms 2 having distant from the main shaft 1 free ends which respectively carry fish-engaging means in the form of suction housings 3 which serve to engage and hold the fish so as to transport the fish 6 from one operating station to the next.

In order for the pair of gripping arms 2 to engage a fish with the pair of fish engaging means 3 at the initial station I, it is necessary for the pair of gripping arms 2 to be spread initially apart from each other and then to approach each other with the fish situated between the pair of fish-engaging means 3, and for this purpose the structure includes a cam 4 which controls the arms 2 as they approach the station I, after leaving the operating station IV, so that the arms will first spread apart from each other and then approach each other in order to grip a fish for transporting the latter to the subsequent operating stations described below. This cam 4 is supported for rotary movement about the axis of the shaft 1, and in a tube 5 there is situated a suitable adjusting structure which is connected with the cam 4 in a manner described below so as to properly adjust the latter angularly in synchronism with the movement of the other components.

During the fileting operation at station IV, the body of the fish, which has previously been beheaded and cleaned, is placed against a supporting block 7, with the fish in a more or less inverted position as shown at the upper central portion of FIG. 1. In this position the fileting of the fish takes place in a manner described in great detail below. At this time, which is to say during approach of the fish 6 onto the block 7, it is necessary for the gripping arms 2 to shorten themselves, and the shortening of the total length of these gripping arms is brought about by a cam 8 shown in FIG. 1 and also described in greater detail below.

The fish are initially received in buckets 10 of a transporting band 9. Each bucket 10 is provided at one end with a stop wall 11 engaged by the head of the fish. The underside of the fish leads the remainder thereof and points forwardly in the direction in which the fish is transported by the endless band 9 which is provided with the buckets 10. This transporting band 9 is preferably an endless band guided over suitable pulleys and driven in any suitable way such as that described below. The result of the transportation of a fish in this way is that it is capable of falling at one end of the endless band into a transporting trough 12 which will receive the fish 6 in the manner shown in dotted lines at the left of FIG. 1, so that the fish is supported in an upright position with its underside engaging the bottom of thhe trough and with the head of the fish facing forwardly in the direction in which the fish is transported.

The transporting trough 12 is pivotally connected at its rear end by a pivot 14, to a free end of a lever 13 which is supported for turning movement by a stationary pivot 15 situated at the end of the lever 13 distant from the trough 12. A reciprocating rod 16 is pivotally connected to the lever 13 intermediate the ends of the latter so as to turn the lever 13 back and forth about the pivot 15 in the manner indicated in FIG. 1. The drive for reciprocating the rod 16 is described below. The result of this operation is that the fish is transported by the trough 12 onto a second trough 17 which slidably receives the trough 12 and is capable of having its elevation adjusted so as to determine in this way the elevation of the fish when it is gripped by a pair of gripping arms 2. The transporting trough 12 advances the fish onto the transporting trough or guide trough 17 down which the fish glides to the operating station I.

During its movement to the bottom end of the guide trough 17, the fish 6 passes between a stationary plate 18, fixed to one side edge of the trough 17 and extending upwardly therefrom, and a turnable feeling lever 19 situated at the other side of the trough and responding to the passage of the fish between the stationary plate 18 and the turnable lever 19 for sensing the thickness of the fish. Thus, the lever 19 forms a feeling means for sensing the maximum thickness of the fish, and in accordance with this maximum thickness of the fish the lever means 19 adjusts a structure, described below for determining the longitudinal and elevational position of the fish, this adjusting structure acting on a head-engaging means 20 which engages the head of the fish and on the trough 17 for determining the elevation of the latter so as to determine also in this way the elevation of the fish. Subsequent to passage through the thickness sensing structure, the fish passes through a pair of guide levers 22 which cooperate in a manner described below to center the fish so that these levers 22 guide the fish properly toward the station I. These guiding levers 22 also serve to prevent any rearward sliding of the fish.

Situated over the fish-guiding trough 17 is an elongated guide 23 which engages the rear or back fins of the fish to participate in the guiding thereof. This back-fin guide 23 is supported for turning movement about a stationary pivot 24 and an unillustrated torsion spring presses on the guide 23 so that the latter engages the fish 6 so as to properly guide the latter.

The fish 6 when reaching the operating station I is in a position of readiness to be engaged between the pair of fish-engaging means 3 situated at the free ends of a pair of fish-gripping arms 2. Through the controls derived from the structure in the tube 5, the cam 4 will control the pair of arms 2 in such a way that they will approach each other to place the pair of opposed fish-engaging means 3 in engagement with the fish 6 at the opposite sides thereof. When the pair of fish-engaging means 3 press against the exterior side surfaces of the fish 6 which is at the position I the hollow interiors of the pair of fish-engaging means 3 are evacuated by a structure described below for automatically applying a vacuum to the hollow interiors of the structures 3. Also, a structure which is described in greater detail below now tilts the head-engaging means 20 downwardly so as to clear the path of movement for the fish 6 by the pair of gripping arms 2 to the operating station II where the head and stomach portions of the fish are removed in a single operation, in accordance with the invention.

Located at the operating station II are a pair of rotary blade means 25 and 26 which simultaneously turn in opposite directions through a single revolution during a complete cycle of operations at the station II. For this purpose this pair of blade means 25 and 26 are respectively driven by a pair of bevel gears 27 which are rotated in opposite directions by a single bevel driving gear 29. The pair of gears 27 are supported by a suitable bracket 28 which is carried by a stationary part of the machine. The counter-rotating blades 25 and 26 are driven from the main drive means described below. After these blades turn through a single revolution the head and stomach portions of the fish have been removed from the body thereof which is still held by the pair of fish-engaging means 3, and the head and stomach portions which are cut away are received in a pocket 213 which is fixed to the rotary blade 26 and which deposits the waste portions of the fish onto an unillustrated transporting device which carries away these head and stomach portions, which are only waste. The details of this structure at operating station II is described in greater detail below. At the end of the operations at station II, the arms 2 are again moved, and they reach the station III shown at the upper right portion of FIG. 1.

At the station III the fish 6 is cleaned. Thus, there is provided at this station a rotary shaft 34 which is continually driven and which carries a brush 31. The rotary brush assembly is supported by a lever which is turnable about a stationary pin 32 and which is urged downwardly by the spring 33, so that in this way the brush bristles are applied to the hollow stomach cavity of the fish so as to efficiently clean the latter. The cleaned fish is then transported by the pair of gripping arms 2 from the operating station III to the operating station IV.

On the way from station III to station IV, the total length of each gripping arm 2 is shortened, and this shortening is brought about by engagement of the arms 2 with the cam 8, the arms 2 respectively carrying slide members 35 which engage and slide along the cam 8 for the purpose of reducing the length of the arms 2. Just before reaching the position IV the slide members 35 move beyond the ends of the cam 8, with the result that the fish 6 which is carried by the arms 2 is now applied against a supporting block 7, and at station IV the fileting operations take place.

The fileting blades 36, which are described in greater detail below, are positioned in readiness to carry out a fileting operating while turning through one revolution, and the fileting blades are driven by a shaft 37, which is supported for rotation and driven in a manner described below. The support block 7 is carried by a plate 38 which is situated between the pair of rotary blades 36. Thus, during the rotation of the fileting blades 36, the filet portions of the fish are removed therefrom in a single operation, leaving at the block 7 the spine and rib portions which are mostly bones. The fileted fish portions are still held by the suction in the interior of the fish-engaging means 3 against the latter, and the arms 2 are then spread apart from each other by the cam 4 so as to position the fish-engaging means 3 at a location proper for dropping the fileted fish portions therefrom. The cam 4 is guided by the structure in the tube 5 in proper synchronism so that the arms 2 will be controlled during movement from the station IV to the station I, so as to properly engage another fish. Once the pair of fish-engaging means 3 with the filets carried thereby are separated from the remainder of the fish which remains at the block 7, air under pressure is applied to the pair of fish-engaging means so as to cause them to drop the filets which are received in a suitable chute 39 shown in dotted lines in FIG. 1, and the filets slide down this chute to a location where they are stored during return of the ship to port.

The sequence and synchronizing of the various operations are illustrated diagrammatically in FIG. 2. Thus, as may be seen from the lower part of FIG. 2, the cycle of operations on one fish includes substantially equal times at the several operating stations as well as during transportation of the fish from one operating station to the next. As may be seen from FIG. 2 at operating station I, the fish is received between the arms 2, as designated by the lowermost indication in FIG. 2. Also, as shown by the uppermost indication in FIG. 2, the arms 2 are spread apart from each other during this first set of operations which take place at station I, the arms being located close enough to each other to grip the fish just before the end of the operations at station I, as is apparent from the upper left portion of the diagram of FIG. 2. Moreover, as is apparent from the upper right portion of FIG. 2, just before the end of the operations at station IV, the arms 2 are again moved apart from each other, and they remain apart from each other, during the turning of each pair of arms 2 from station IV to station I. In other words, the heavy line portions at the top of the diagram of FIG. 2 indicate the time during each operating cycle when the arms 2 are apart from each other, while during the remainder of each operating cycle the arms 2 are relatively close to each other placing the pair of fish-engaging means in an engagement with the fish so that the latter is carried by the fish-gripping structure of the invention at this time.

The second indication from the top of FIG. 2 indicates that the filets are released during approximately a central portion of the transportation of the arms 2 from station IV to station I, and simultaneously with the fish release air pressure is applied to the pair of fish-engaging means, which accounts for the alignment of the second and third operations indicated in the diagram of FIG. 2.

Referring to the fourth operation from the top of FIG. 2, namely the time of each cycle during which suction is applied, it is clear that suction is applied to the pair of fish-engaging means during almost the entire operating cycle from just before the end of the operations at station I until shortly after the arms 2 start to move from station IV to station I.

Referring now to the next three operations, indicated in FIG. 2 beneath the suction operation, it will be seen that the fileting takes place at station IV, the cleaning takes place at station III, and the beheading, as well as removal of the stomach at the same time, takes place at operating station II. The lowermost indication at the lower left of FIG. 1 indicates that the operations in connection with receiving of the fish by the pair of fishholding arms 2 takes place during the cycle at operation station I. The transporting of the fish, of course, takes place, as shown by the second indication from the bottom of FIG. 2, during those parts of the cycle which are situated between the operations taking place at the stations I–IV. Thus, FIG. 2 gives an over-all picture of the various operations and the manner in which they are synchronized with respect to each other.

*Driving structure*

Figure 4:
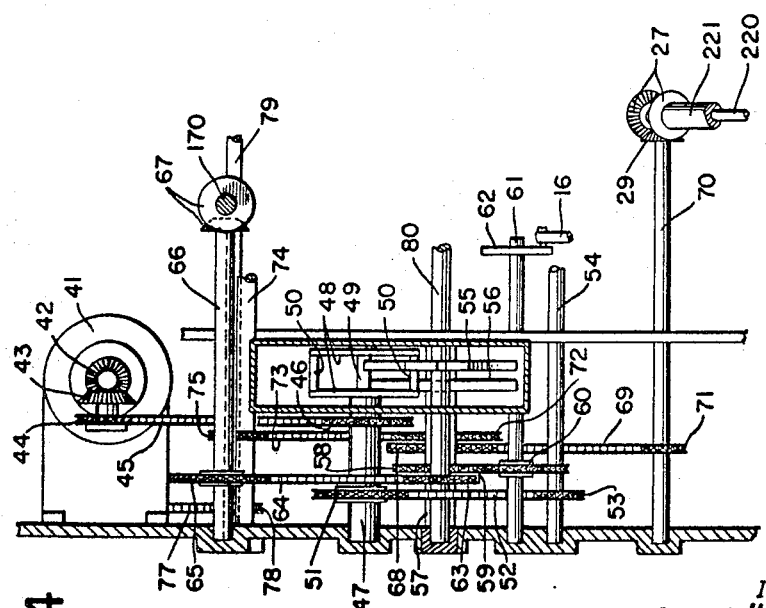
FIG. 4 is a side view of the structure shown in FIG. 3.

FIGS. 3 and 4 illustrate the principal components of the drive assembly of the invention which serves to drive the various parts of the apparatus as described below. An accurate illustration of the transmission ratios is however not provided, for the sake of clarity.

A driving motor 40 driven from any suitable source of electric power drives through the step-down transmission 41 a pair of meshing bevel gears 42 and 43. A gear 44 (FIG. 4) is fixed coaxially to the gear 43 for rotation therewith and drives an endless chain 45 which transmits the rotation of the gear or sprocket wheel 44 to the sprocket wheel 46 which is fixed to a drive shaft 47.

This drive shaft 47 fixedly carries structure for driving a Maltese cross driving assembly of the invention. The Maltese cross drive of the invention includes a pair of parallel rigid plates 48 which are fixed to the shaft 47 for rotation therewith and which are connected to a pair of drive pins 49 which extend between and are fixed to the diametrically opposed tip portions of the plates 48 so as to transmit a drive from the latter to a pair of Maltese crosses as described below. In order to improve the wear of the structure, the pair of motion-transmitting pins 49 can pass through freely turnable sleeves. Displaced by angles of 90 degrees between the pair of diametrically opposed pins 49 are a pair of curved holding plates 50 which extend between and are fixed to the plates 49 and which serve in a manner described below to alternately hold the pair of Maltese crosses stationary. A sprocket wheel 51 is fixed to the shaft 47 for rotation therewith and drives a chain 52 which serves to transmit the drive to a rotary sprocket wheel 53 which is fixed to a shaft 54 which is thus driven continuously.

A pair of identical Maltese crosses 55 and 56 which have parallel axes, respectively, are situated at such a distance from each other with respect to the Maltese cross drive 48–50 that these Malteses crosses will alternately be driven through angles of 90 degrees. Thus, it will be seen from FIG. 3 in particular that each of the Maltese crosses 55 and 56 is provided with four radial slots displaced from each other by 90 degrees and adapted successively to receive one of the drive pins 49 during rotation of the pair of plates 48 together with the shaft 47. As may be seen particularly from FIG. 4, the pair of Maltese crosses are not in a common plane. Thus, the Maltese cross 55 which is carried by the shaft 80 is situated in a plane which is spaced from and parallel to the plane which receives the Maltese cross 56 which is carried by the shaft 57.

Assuming now that the Maltese cross drive 48–50 turns in a clockwise direction, as indicated by the arrow in FIG. 3, then the right pin 49 of the FIG. 3 will enter into the upwardly directed slot of the Maltese cross 56 while the left pin has just left the upwardly directed slot of the Maltese cross 55. The result is that the Maltese cross 56 will now be turned during the next quarter of a revolution of the shaft 47 in a counterclockwise direction, as indicated by the arrow in FIG. 3. At this time the lower curved holding plate 50 of FIG. 3 moves along an arcuate peripheral portion which is situated between the upper and right slots of the Maltese cross 55, so that the lower holding plate 50 of FIG. 3 prevents rotation of the Maltese cross 55 at this time. However, when the plates 48 have turned through 90 degrees in a clockwise direction beyond the position shown in FIG. 3, the upper slot of the Maltese cross 56 will now occupy the position occupied by the left hand slot of the Maltese cross 56 of FIG. 3. The right pin 49 will now enter into the right hand slot of the Maltese cross 55 of FIG. 3 while the upper holding plate 50 will now move along an arcuate edge of the Maltese cross 56 to maintain the latter stationary while, during the continued rotation of the shaft 47, the right pin 49 which is now in the right slot of the Maltese cross 55 will turn the latter in a counter-clock-wise direction, as indicated by the arrow. In this way the pair of Maltese crosses are alternately held stationary and turned through increments of 90 degrees.

The shaft 57 which carries the Maltese cross 56 also fixedly carries a sprocket wheel 58 which meshes with an endless chain 59 which transmits the drive to a sprocket 60 which is fixed to the rotary shaft 61. This shaft 61, which appears at the lower left of FIG. 3, fixedly carries a crank disc 62 which is pivotally connected with the end of the reciprocating rod 16 which is distant from the lever 13 shown in FIG. 1, so that in this way the reciprocation of the fish-transporting trough 12 is carried out.

The shaft 80 which carries the Maltese cross 55 also fixedly carries a sprocket wheel 63 which drives a chain 64 which transmits the drive to a sprocket wheel 65 fixedly carried by a rotary shaft 66 which through the pair of bevel gears 67 drives the shaft 170 which serves to drive the endless conveyer band 9.

The shaft 57, which carries the Maltese cross 56, fixedly carries a sprocket wheel 68 which drives through the endless chain 69 a sprocket wheel 71 fixed on a shaft 70. The shaft 70 drives the bevel gear 29 which meshes with the pair of bevel gears 27 for driving the rotary blade 25 and the rotary blade 26, respectively, in opposed directions of rotation in a manner described below and with the synchronism determined by the Maltese cross 56.

The sprocket wheel 72, which is fixed to the shaft 57, drives, through the endless chain 73, the sprocket wheel 75 which is fixed to the shaft 74 which is an integral extension of the shaft 37 which drives the pair of fileting blades 36, also with a synchronization determined by the Maltese cross 56.

The motor 40 (FIG. 3) itself directly drives a pair of meshing bevel gears 76 which through a non-illustrated sprocket gear serve to drive an endless chain 77 which transmits the drive to a sprocket wheel 78 fixed to a shaft 79. This shaft 79 is an integral extension of the shaft 34 and serves to drive the rotary brush 31 for cleaning the fish at station III.

*Fish carrying and transporting structure*

Figure 5:
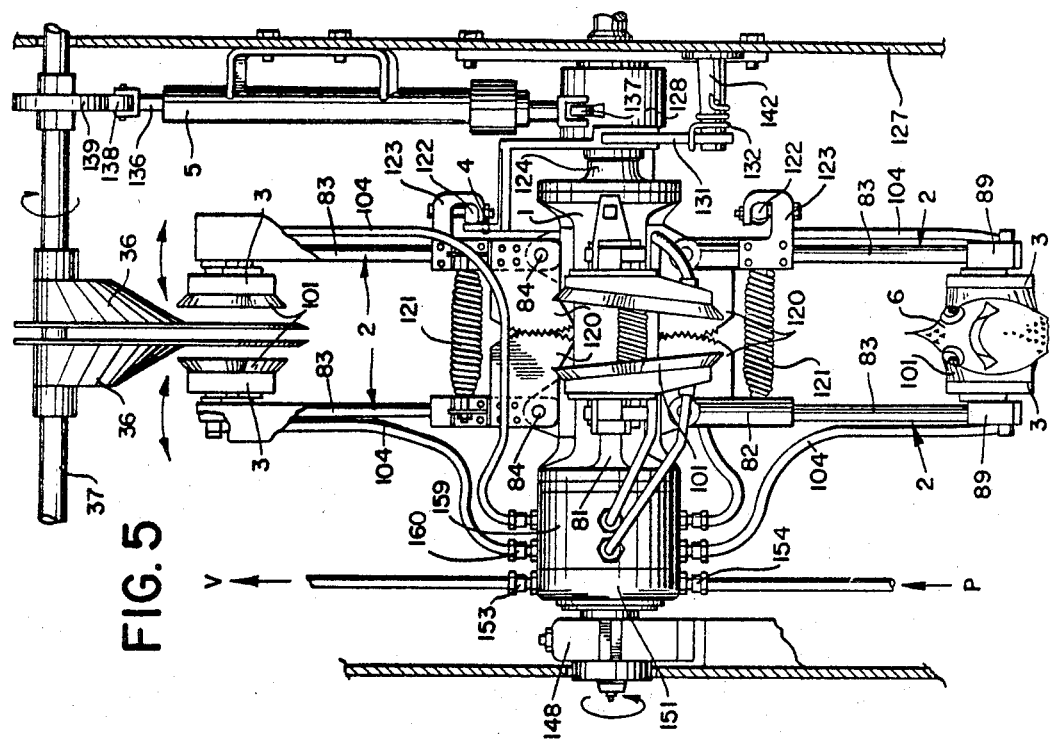
FIG. 5 is an elevation, partly in section, of the structure for transporting the fish from station to station.

FIGS. 5–7 illustrate the essential components of the structure for carrying and transporting the fish 6 from one operating station to the next. The main shaft 1 which is driven from the Maltese cross 55 is fixedly connected with mounting portions 81 which serve to carry the elements 82. As is apparent from FIG. 1, there are in the illustrated example four pairs of gripping arms 2 uniformly distributed about the shaft 1. Each gripping arm 2 includes a tubular member 82 which telescopically receives an elongated tubular member 83. These members extend perpendicularly to the shaft 1. Each of the tubular members 82 is connected by a pivot pin 84 to the mounting portion 81.

As is shown in FIGS. 6 and 7, the tubular portion 83 of each arm 2 is axially slidable within the tubular portion 82. Each tubular portion 83 has a portion 85 of enlarged diameter received within the tubular portion 82. Each tubular portion 82 threadedly carries at its outer free end a nut 86 which is threaded into the tubular portion 82 and extends over the shoulder formed by the free end of the enlarged diameter portion 85 of tubular member 83, so that the nut 86 limits the movement of the tubular member 83 outwardly of the tubular member 82. The portion 85 of each tubular member 83 is formed at its end which is within the tubular member 82 with a pair of diametrically opposed notches extending axially from the free end of the portion 85, and these notches slidably receive axially extending legs of a substantially U-shaped member 88 which is fixed to the interior of the member 82 and against which an end of the spring 87 bears, so that in this way the members 83 cannot turn with respect to the member 82 but can only move axially with respect thereto.

The outer end of each tubular portion 83 fixedly carries a bearing component 89 and a bearing component 90 which together with the bearing component 89 forms a bearing for the fish engaging means 3. These bearing components 89 and 90 serve to hold a sleeve 92 which fixedly carries a bearing pin 91. The bearing pin 91 extends through an opening of a holding member 93, and the bearing pin 91 fixedly carries a collar 94 situated directly over the holding member 93. A spring 95 rests on the collar 94 and surrounds the pin 91. A nut 96 is threaded onto the pin 91 and presses a washer 97 against a shoulder or other projection of the pin 91. In this way the washer 97 is situated at a predetermined distance from the collar 94 and in the space between the washer 97 and the collar 94 is situated the spring 95. The free ends of this spring respectively bear against a pin 98, which is fixed to and projects from the turnable holding member 93 and a pin 99 which is fixed to the collar 94, so that in this way the spring 95 serves to urge the holding member 93 to a predetermined angular position with respect to the pin 91.

A slide member 100 is fixed to the outer free end of the bearing member 89.

The fish-engaging means 3 is fixed with the holding member 93. In order to adapt itself to the configuration of the fish, the fish-engaging means 3 is provided with an elastic yieldable lip 101 made of soft rubber, for example. In addition, the inner wall 102 of the fish-engaging means 3 is formed with ribs or the like so as to have a relatively high coefficient of friction. In this way slipping of the fish 6 after it is engaged by the fish-engaging means 3 is reliably avoided. The interior of the fish-engaging means 3 is either evacuated by applying suction hereto or is provided with air under pressure, for purposes referred to above, and in order to alternately provide the interior of the fish-engaging means 3 with suction or with pressure during each cycle a valve means 103 is provided. The valve means 103 communicates with the conduit 104 which has the position shown in FIG. 7 so that through this conduit 104 suction or air under pressure may be applied to the interior of the fish-engaging means 3.

The details of the valve means 103 of the invention are illustrated in FIG. 8.

As is apparent from FIGS. 6–8, the fish-engaging means 3 has a wall through which a tubular member 105 of the valve means 103 passes, the relatively tight mounting of the tubular member 105 on this wall being shown most clearly in FIG. 8. A tube 106 serves to connect the valve means with a conduit through which suction or pressure are applied, and this tube 106 has a hollow annular portion received between a pair of sealing rings 107 which respectively surround a hollow tubular member 108 which is threaded onto the tube 105 and which has a closed outer end, this member 108 serving to clamp the member 106 between the sealing rings 107 as well as to press the latter against the member 106 and to pull the larger diameter portion of the tubular member 105 against the wall of the fish-engaging means 3, as shown in FIG. 8. Thus, through the threaded connection of the tubular member 108 with the member 105 the parts shown in FIG. 8 to the left of the wall of the fish-engaging means 3 are maintained assembled with each other. The tubular member 108 is formed with transverse bores passing through its wall so that in this way the interior of member 106 will communicate through the member 108 with the interior of the tubular member 105.

On the side of the wall of the fish-engaging means 3 which is opposite from the member 108, the tubular member 105 has an outwardly directed flange 109 which is former at its periphery with bores 110 extending parallel to the axial bore of the tubular member 105 and of course spaced from the tubular member 105. A hollow valve cap 103 has an inner cylindrical surface slidably engaging the exterior cylindrical surface of the flange 109 so that the cap 103 is axially slidable along the tubular member 105, and at its inner end this cap 103 has an inwardly directed flange whose inner cylindrical surface slidably engages the exterior cylindrical surface of the tubular member 105. This inwardly directed flange of the cap 103 carries a sealing ring 111 which in the illustrated position engages the openings 110 so as to close the latter. In addition it will be noted that the cap 103 itself is formed in its side wall with a plurality of openings 112 which are uniformly distributed about the member 103 and which in the illustrated closed position of the valve, shown in FIG. 8, are closed by the exterior surface of the flange 109. A plurality of screws 113 serve to fix to the free end of the tubular member 105 a spacer member 114 provided with air passages 116 through which the bores 110 communicate with the interior of the tubular member 105. This spacer member 104 is formed at its face which is directed away from the tubular member 105 with a circular recess receiving one end of a coil spring 115 which is compressed between the spacer member 114 and the end wall 118 of the cap 103, this end wall 118 being fluid-tightly threaded into the cylindrical portion of the cap 103 and having in its interior a guide pin 117 for extending into the coil spring 115 so as to guide the latter. At its exterior the end wall 118 of the cylindrical cap 103 is formed with a pair of bores 119 for receiving the pins of a suitable wrench used for assembly and disassembly the components of the valve means.

When the fish-engaging means 3 engages a fish, the exterior surface of the fish engages the end wall 118 of the cap 103 to depress the latter in opposition to the spring 115 inwardly along the tubular member 105. Thus, on the one hand, the sealing ring 111 is displaced away from the bores 110 and, on the other hand, the bores 112 are displaced from the flange 109 so as to be uncovered and in this way the hollow interior of the fish-engaging means 3 communicates through the bores 112 and 110 as well as through the passages 116 of the spacer member 114 with the tubular interior of the member 105, so that when vacuum or pressure are respectively applied to the tubular member 106, this vacuum or pressure will also be applied to the interior of the fish-engaging means 3. It is to be noted that if a vacuum is applied through the tubular member 106, then the communication of this vacuum with the space surrounding the cap 103 depends upon the movement of the latter in opposition to the spring 115 to a position uncovering the openings 110 and 112 as described above. On the other hand, when air under pressure is supplied to the tubular member 106, this air under pressure will itself serve to displace the sealing ring 111 away from the openings 110 so that the air under pressure is capable of automatically opening the valve irrespective of whether an outside force acts on the cap 103 to displace the latter from the closed position to which it is urged by the spring 115. A control structure described below determines whether the fish-engaging means 3 is supplied with air under pressure or is subjected to a vacuum.

Referring now to FIG. 5, a pair of toothed sectors 120 are respectively fixed to the members 82 of each pair of arm means 2, and this pair of toothed sectors 120 are in mesh with each other so that the turning movement of one of a pair of arms 2 about its axis 84 will necessarily result in equal and opposite turning of the other of the pair of arms 2 about its own axis 84. A spring 121 extends between and is connected at its ends to the members 82 of each pair of arm means 2, so as to pull the pair of arm means toward each other. One of the members 82 of each pair of arm means 2, namely the right one shown in FIG. 5, carries a control roller 122 which is mounted on a suitable bracket 123 carried by the member 82. During turning of each pair of arm means 2 from the operating position IV to the operating station I, it is this control roller 122 which rides along the cam 4. The function of this cam 4 is explained in greater detail below. The controls for spreading the pair of arms of each pair of arm means 2 apart from each other as well as for controlling their movement toward each other is illustrated in FIGS. 9–11.

Referring to FIG. 9, it will be seen that a rotary shaft 124 is flanged to the main shaft 1 so as to be coaxial therewith and so as to support the latter for rotation, a similar rotary shaft being located at the end of the shaft 1 opposite from that shown in FIG. 9. A pair of ball bearings 125 are carried by a bearing housing 126 and serve to support the support shaft 124, and of course the main shaft 1 coaxially coupled thereto, for rotary movement. The bearing housing 126 is fixedly carried by a stationary wall 127 of the supporting framework of the machine. The cam 4 is carried by a cam support 128 which surrounds the bearing housing 126 and which is supported for turning movement by a pair of ball bearings 129 which are carried by the housing 126 at its exterior. The cam 4 is fixedly mounted on the cam support 128. The carrier 123 for the cam follower roller 122, which rides along the cam 4, is shown also in FIG. 9, and FIG. 11 shows a developed view of the cam 4.

The movement of the arms of each pair of arms 2 toward and away from each other therefore depends upon the curvature of the cam 4 as illustrated in FIG. 11. As is shown most clearly in FIG. 10, a lock member 130 is fixedly carried by the cam carrier 128. A locking pawl 131 which cooperates with the lock member 130 is pivotally carried by a bracket which is fixed to the supporting wall 127, and a spring acts on the pawl 131 to urge it in a clockwise direction, as viewed in FIG. 10. The rotary supporting shaft 124 carries a cam 143 which is engaged by a cam follower roller 133 turnable carried by an arm of the pawl 131 so that the cam 143 controls the locking and unlocking of the carrier 128.

The elongated tubular support 5 is fixedly carried by the wall 127. The ends of the tubular support 5 carry a pair of bearings 134 and 135, respectively, which support for longitudinal sliding movement an elongated control bar 136. The cam carrier 128 also fixedly carries a member 137 which is pivotally connected with one end of the control bar 136. The opposite end of the control bar 136 carries a cam follower roller 138 which engages a cam 139 which is fixed to the shaft 74 which also is fixed with the fileting blades to rotate the latter. In the interior of the tube 5 the bar 136 fixedly carries a collar 140 against which one end of a coil spring 141 bears, this spring being coiled about the bar 136 and bearing at its other end against the bearing 134 which guides the bar 136.

Assuming now that a pair of arms 2 are in the location where the operating station IV is situated, and this is the position illustrated in FIG. 10, then the remaining pairs of arms 2 are respectively situated at the operation stations I, II and III. These remaining pairs of arms are not illustrated in FIG. 10 for the sake of clarity. Assuming now that the filet blade shaft 74 is driven by the Maltese cross 56 and thus turns through 360 degrees in a clockwise direction, as indicated by the arrow in FIG. 10, then the following operations take place:

After the cam 139 has turned for approximately 270 degrees the cam follower roller 138 is engaged by the camming portion of the cam 139, with the result that the bar 136 is depressed downwardly through a distance sufficient to cause the pawl 131 to engage the lock member 130. The result is that the cam 4 has been turned so that the point 4 thereof has been shifted to the location of the point 5 indicated in FIGS. 10 and 11, with the result that the spreading of the pair of arms 2, at operating station IV, apart from each other has been initiated. At the same time the pair of arms which are situated at operating station I have been acted upon by shifting of the point 1 of the cam 4 into the position occupied previously by the point 2 thereof, as shown in FIGS. 10 and 11, with the result that at the operating station I the pair of arms 2 start to approach each other simultaneously with the spreading apart of the pair of arms at the operating station IV.

During the next following rotation of the shaft 1 through 90 degrees the pair of arms at the operating station IV turn toward the operating station I. During this operation this latter pair of arms will of course be spread further apart from each other by rolling of the roller 122 along the cam 4 from the point 4 thereof to the point 3 shown in FIGS. 10 and 11. By operation of the cam 143, which is fixed to the shaft 124 and therefore operates in synchronism with the pair of arms 2, the bar 136 is unlocked, and the spring 141 now returns the control bar 136 to its initial position so as to return cam 4 to its initial position. As the pair of arms 2 arrive at the operating station I the above operations are repeated so that these arms 2 move toward each other through a distance sufficient to grip the new fish which is at the operating station I, and of course operations at station IV are repeated for the next pair of arms which become situated at the operating station IV.

*Control valve assembly*

Figure 12:
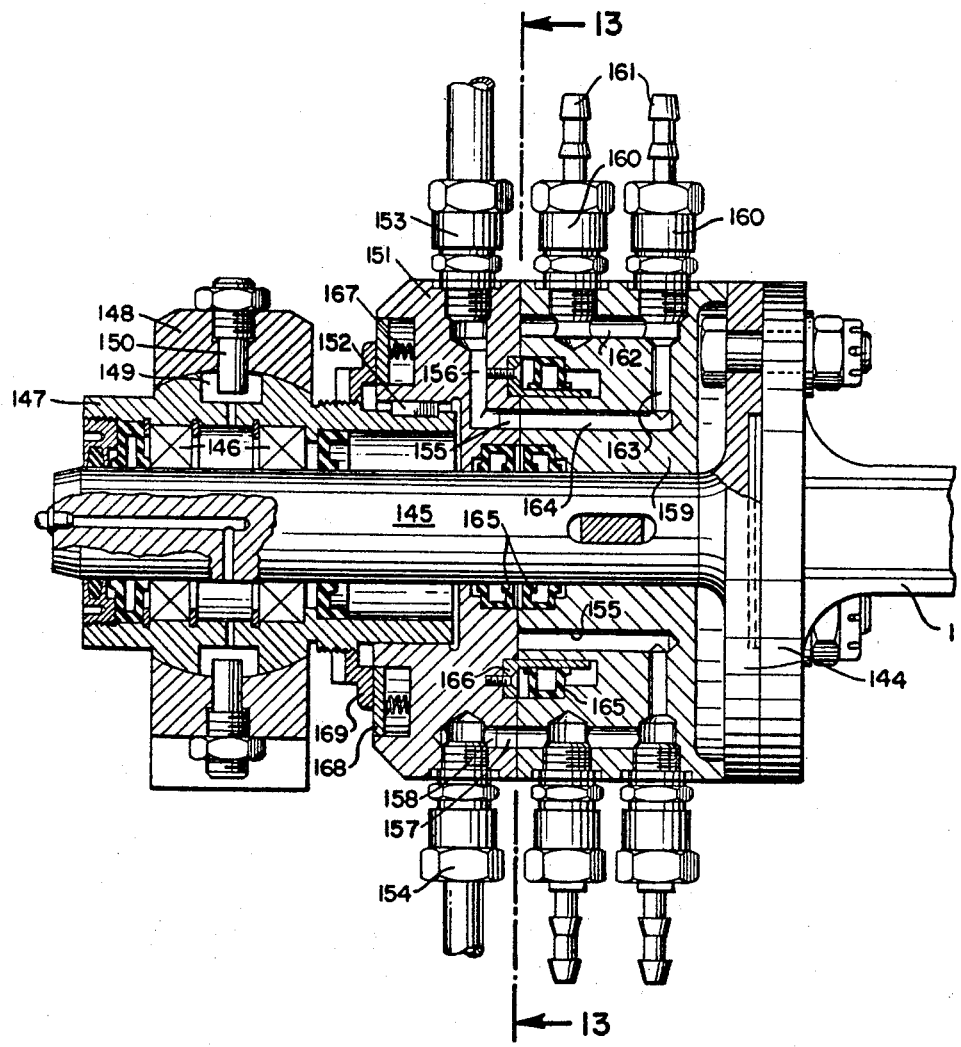
FIG. 12 is a longitudinal sectional elevation of a control valve arrangement for providing alternate suction and pressure at the fish-engaging means of the invention.

FIGS. 12 and 13 illustrate the control valve assembly for controlling the application of pressure and suction to the fish-gripping means 3.

As is shown in FIG. 12, the end of the main shaft 1 which is opposite from that shown in FIG. 9, is coaxially coupled, by flanges 144, to a second rotary supporting shaft 145. This shaft 145 is supported for rotation by a pair of ball bearings 146 supported in a bearing housing 147. By unillustrated sealing rings the ball bearings 146 are protected from spray water. The bearing housing 147 has an exterior convexly curved profile which is received in a bearing member 148. The convexly curved exterior surface of the bearing housing 147 is formed with a pair of diametrically opposed grooves 149 which respectively receive pins 150 carried by the bearing support 148, so that in this way a limited guided turning of the bearing housing 147 with respect to the support 148 is possible.

An air guiding member 151 is supported on the bearing housing 147 for axial movement, and a key 152, fixed to the bearing housing 147 at a tubular extension thereof, engages in an axial keyway of the annular air guide 151 to prevent turning of the latter with respect to the support 147. The air guide 151 is threadedly connected with a fitting 153 which communicates with a source of suction, such as a suitable vacuum pump, while the diametrically opposed part of the air guide 151 is threadedly connected with a fitting 154 which is in communication with a source of air under pressure, such as a suitable compressor. An arcuate suction passage or groove 155 is formed in the flat right face of air guide 151, as viewed in FIG. 12, and communicates through a bore 156 thereof with the fitting 153. In addition, this same face of air guide 151 is formed with an arcuate air pressure groove 157 which communicates through a bore 158 with the fitting 154 of the air under pressure.

The air guide 151 forms a stationary valve member which has at its right end, as viewed in FIG. 12, a flat face formed with the grooves 155 and 157 and slideably engaged by and cooperating with a rotary valve member 159, fixed to the shaft 145 for rotation therewith. Pairs of fittings 160, respectively corresponding to the pairs of arms 2, are threadedly carried by the rotary valve member 159 at its outer periphery, and these pairs of fittings 160 respectively communicate with the tubular extensions 161 which are connected to hoses which respectively extend to the valves of the pairs of fish-engaging means 3 which are respectively carried by the pairs of arms 2. The rotary valve member 159 is formed with bores which respectively communicate with the fittings 160 for supplying suction or air pressure thereto, and these bores of the valve 159 are also distributed in the same way as the operating stations I–IV.

The manner in which these bores extend is apparent from FIG. 12. Thus, an inner axial bore 164 of the member 159 communicates through a radial bore 163 with an outer axial bore 162 which directly communicates with the fittings 160, and the bores 162–164 are located in a common radial plane in which the pair of fittings 160 communicating therewith are also located. Moreover, as is apparent from FIG. 13, the passage 155 for the suction is in the form of an arc of a circle whose center is in the axis of the shaft 145, and the same is true of the passage 157 for the air pressure. However, it is to be noted that the arcuate groove 157 is located along a circle whose radius is greater than that along which the groove 155 is located. These grooves are of course covered by the flat face of the rotary valve member 159 which engages the flat face of the stationary valve member 151. Furthermore, the radial distance of the axial bore 164 from the shaft 145 is equal to the radial distance of the groove 155 from the shaft 145, while the radial distance of the bore 162 from the axis of the shaft 145 is equal to the radial distance of the groove 157 from this axis. Moreover, as is apparent from FIG. 13, the grooves 155 and 157 are angularly offset so that they are in a substantially non-overlapping relationship. Therefore, since the pair of axial bores 162 and 164 which communicate with each other through the radial bore 163 located therewith in a common radial plane, when the inner bore 164 communicates with the groove 155 the outer bore 162 is closed while when this latter bore 162 communicates with the groove 157 the bore 164 is closed, and thus, during each revolution, for a relatively major part of the revolution suction will be applied through the groove 155 and the bore 164 while during a relatively small part of each revolution air pressure will be applied through the groove 157 and the bore 162.

In order to provide a good seal between the stationary member 151 and the rotary member 159, several sealing rings 165 are included in the assembly, as shown most clearly in FIG. 12. In addition, a sealing sleeve 166 which is fixed coaxially to the stationary member 151 extends into an annular groove formed in the rotary member 159 and engages a surface of this groove to provide a further guarantee of fluid-tight cooperation between the stationary and rotary valve members. A further improvement of this seal is achieved by providing the springs 167 which urge the stationary member 151 into engagement with the rotary member 159. The several springs 167 are uniformly distributed about the member 151 in a groove thereof and press against a ring 168 which is axially movable in this groove, this ring 168 being engaged by a rotary adjusting member 169 which is threaded onto an exterior threaded portion of the bearing housing 147, so that the threaded ring 169 can be turned to adjust the pressure with which the springs 167 urge the member 151 toward the rotary member 159.

*Fish-positioning structure*

FIG. 14 shows a structure for guiding and adjusting the position of a fish so that it will be properly gripped by the pair of arms 2 which reach the operating station I. The rotary drive shaft 170 is driven together with the Maltese cross shaft 80. This shaft of course drives the endless conveyor 9, and in this way there is a timed delivery of the successive fish 6 to the machine of the invention.

FIG. 14 shows a fish 6 in position in a bucket 10 of the conveyor with the head of the fish engaging the stop 11 and with the underside of the fish facing forwardly. The endless conveyer 9 operates in synchronism with the Maltese cross 55, as described above.

When a bucket 10 with a fish therein reaches the front end of the conveyer, it tilts downwardly and a fish drops out of a bucket 10 into the transporting trough 12. The head of the fish is of course directed forwardly at the front end thereof and the underside of the fish engages the bottom of the trough 12. As is shown in FIGS. 14–16, the inner side surfaces of the trough 12 are provided with a plurality of rows of teeth 171 which are so shaped and directed that they do not injure a fish which drops into the trough 12 but at the same time prevents slipping of the fish 6 in the trough 12 so that the fish 6 remains stationary therein during the forward movement of the transporting trough 12. The rod 16 is reciprocated in response to turning of the Maltese cross 56 so as to turn the arm 13 back and forth. During turning of the arm 13 in a clockwise direction, as viewed in FIG. 14, the transporting trough 12 turns forwardly so as to enter further into the trough 17 which is slidably engaged at its interior by the exterior surface of the trough 12. As a result the fish 6 slides forwardly from the trough 12 into the trough 17 to pass through the fish-positioning means 18–22.

During movement through this latter means the fish will on one side slide against the stationary rail 18 carried by the trough 17 and will at its other side displace the feeler lever 19 which senses the maximum thickness of the fish, so as to automatically determine the position thereof in a manner described below. The elevation of the fish is determined by the elevation of the trough 17 while the longitudinal position of the fish is determined by the head-engaging means 20. After passing through the elements 18 and 19, the fish passes between the pair of guides 22 which serve to center the fish. In this way the fish is placed in an aboslutely central position and at the same time a rearward slipping of the fish is reliably avoided.

The centering levers 22 are respectively carried by a pair of rotary shafts 172 which are respectively fixed with gear sectors 173 which mesh with each other, and a pair of lever arms are respectively fixed to the shafts 172 and are interconnected by a spring 174 which urges them to turn toward each other so that in this way the guide levers 22 are urged to turn toward each other in equal and opposite directions.

The transporting trough 12 is retracted through rearward turning of the arm 13 as a result of turning of the Maltese cross 56, so that this trough 12 is now in position to receive the next fish from the next bucket 10.

The head of the fish, which slides from the trough 12 downwardly along the trough 17, is engaged by the head-engaging means 20 which is automatically positioned in accordance with the thickness of the fish sensed by the lever 19. This automatic positioning of the head-engaging means 20. in accordance with the size of the fish, takes place in the following manner:

Before the fish engages the lever 19 the head-engaging means 20, in the form of a hollow member which receives in its interior the head of the fish, is in a position corresponding to the size of the smallest fish which can be handled by the apparatus. As a result, the spring 175 is under its greatest tension, this spring 175 urging the head-engaging means 20 toward the position corresponding to the largest fish which can be handled by the apparatus. The feeler lever 19 will of course be deflected in accordance with the thickness of the fish 6. This lever 19 is fixed with an elongated bar 176 which turns with the lever 19 and which is acted upon by a spring 177 which turns the bar 176 in a direction which urges the lever 19 toward the stationary guide 18. The deflection of the lever 19 will turn the bar 176 in opposition to the spring 177 so as to displace an elongated connecting bar 178 toward the left, as viewed in FIG. 14, with the result that blocking linkage 179 tends to be raised away from a stationary cam 180.

The head-engaging means 20 is supported for sliding movement on a stationary guide 181 which extends into suitable grooves of the head-engaging means 20, as indicated in FIG. 14. The spring 175 is connected at one end to the stationary guide member 181 and at its opposite end to the head-engaging means 20 to retract the latter to the position corresponding to the largest fish. At the same time, a curved portion 182 of the head-engaging means 20 engages a lever 184 which is fixed to a rotary shaft 183. The rotary shaft 183 is fixedly connected with a lever 185 which is turnably connected with an elongated shaft 186 which extends parallel to the shaft 183 and which is connected to the blocking lever 179.

When the blocking lever 179 is raised away from the cam 180 by engagement of the lever 19 with a fish, the head-engaging means 20 is moved by the spring 175 toward a position corresponding to a fish of larger size, and as soon as the fish passes beyond the lever 19 the spring 177 acts through the elements 176 and 178 on the lever 179 to return it into engagement with the blocking cam 180, so that the head-engaging means 20 is stopped in a predetermined position. A relatively large fish thus activates the lever 19 so that the head-engaging means 20 moves through a relatively large distance from the position of the smallest fish, while a relatively small fish will permit spring 175 to provide a relatively small displacement of the head-engaging means 20, from its initial position corresponding to the smallest fish, and in this way this head-engaging means is positioned in accordance with the size of the fish. The shaft 186 is also connected with an elongated link 187.

A cam 21 is fixed to the underside of the trough 17 and engages the curved portion 182 of the head-engaging means 20, so that as the latter is retracted toward the position of a larger fish the trough 17 is lowered. When head-engaging means 20 is moved in opposition to the spring 175 back to its initial position corresponding to the smallest fish the trough 17 is automatically raised, and in this way the elevation of a fish in accordance with its size is also automatically determined. The position of the fish 6 which is thus automatically determined will automatically locate the fish at a proper location to be engaged by the pair of fish-engaging means 3 of the pair of arms 2 which subsequently reach the operating station I.

The shaft 54 shown in FIG. 14 is driven in synchronism with the Maltese cross drive 48–50, and this shaft 54 rotates the cams 188 and 189. Before a fish at the position I is carried away by a pair of arms 2, it is necessary for the head-engaging means 20 to be tilted downwardly so as to be out of the path of movement of the fish by the pair of arms 2. The slide bar 181 which serves to guide the head-engaging means 20 for slidable movement is fixed to a hollow shaft 190 through which the shaft 183 passes so that the left end of the latter, is as viewed in FIG. 14, can fixedly carry the lever 184, as described above. However, the guide 181 together with the hollow shaft 190 are capable of turning about the shaft 183. This hollow shaft 190 is fixed with a lever 191 pivotally connected by links 192 and 193 to the rotary cam 189, the latter having a camming groove receiving a pin fixed to the link 193 which has a stationary pivotal connection at its rear end and at its front end is pivoted to the link 192 which is in turn pivotally linked to the lever 191. At a proper time during the cycle the cam 189 raises the lever 193 which acts through the link 192 on the lever 191 for turning the hollow shaft 190 and the guide 181 therewith in a direction which displaces the head-engaging means 20 downwardly away from the head of the fish so as to release the latter for movement by the pair of arms 2.

It is to be noted that the curved portion 182 of the head-engaging means extends along a circle whose center is in the common axis of the shaft 183 and 190, so that during tilting of the head-engaging means 20 downwardly away from the head of the fish the elevation of the cam 21 remains unchanged. It is also to be noted that simultaneously with the turning of the hollow shaft 190 to displace the head-engaging means 20 away from the head of the fish, the curved portion 182 turns away from the lever 184 so that the spring 175 displaces the head-engaging means 20 toward the position of the largest possible fish which can be handled by the apparatus.

After a fish 6 has been carried away from the station I by a pair of arms 2, to the next operating station II, the cam 189 continues to turn so as to return the head-engaging means 20 to its upright position. Then the cam 188 acts through the lever 194, which is pivoted about a stationary point and which has a cam follower pin engaging the cam 188, to displace the link 187 so as to turn the lever 185 and the shaft 183 therewith in a direction which causes the lever 184 to act through the portion 182 of the head-engaging means 20 on the latter to displace the latter in opposition to the spring 175 to the position of the smallest fish, and the lever 179 automatically blocks the parts in this position in readiness for the next fish.

Another embodiment of a fish-positioning means is illustrated in FIG. 17.

Shown in FIG. 17 is a fish-receiving trough 195 which is supported for turning movement about a stationary pivot 196. A cam 197 is fixed to the underside of the trough 195. A hollow shaft 198 is supported for rotary movement through any suitable bearings and is fixed at one end to an elongated channel-shaped guide 199 which serves to guide the slide member 200 for longitudinal movement, this slide member 200 carrying the head-engaging means 201 of this embodiment. A spring 202 is connected between the slide member 200 and its guide 199 so as to urge the head-engaging means 201 to its position corresponding to the largest fish. A rotary shaft 203 extends through the hollow shaft 198 and through the guide 199, beneath the slide member 200, and the free end of this shaft 203 fixedly carries a lever 204 which acts on an angular extension of the slide member 200 so as to displace the latter, a further extension of the slide member 200 engaging the cam 197 so as to determine the elevation of the trough 195. The continuously rotating shaft 54 fixedly carries three cams 205, 206, and 207.

The shaft 203 fixedly carries a lever 208 connected to one end of a spring 209 whose opposite end is fixed to a lever 210 supported for turning movement by a stationary pivot. This lever 210 carries a cam follower pin which cooperates with a camming groove of the cam 205.

The hollow shaft 198 fixedly carries a lever 211 which is operatively connected with an additional lever 212 by a pin-and-slot connection, as shown in FIG. 17, and the lever 212 is supported for turning movement by a stationary pivot and carries a cam follower pin extending into a camming groove of the rotary cam 206.

The rotary cam 207 engages a cam follower extension of one of the pair of arms 2 in such a way as to provide for a gradual approach of these arms toward each other at the operating station I.

Each fish 6 is delivered from a suitable chute or the like into the trough 195 with the underside of the fish directed downwardly and with the head of the fish at the front end thereof as it slides down the chute 195, as indicated in FIG. 17. Thus, the head of the fish will slide toward the head-engaging means 201. Initially the structure is positioned at the location for the largest fish, so that the trough 195 is at its lowest elevation and the head-engaging means 201 is retracted downwardly from the position shown in FIG. 17.

At this time the cams 205–207 turn. The cam 207 causes the pair of arms 2 to approach each other. The cam 205 acts through elements 208–210 to turn the shaft 203 so as to cause the lever 204 to displace the head-engaging means 201 toward the position of a smaller fish. Spring 209 is stronger then spring 202. Thus, the fish whose head is engaged by the hollow member 201 will be slidably moved back up the guide 195 as the arms 2 approach each other in order to engage the fish with the pair of fish-engaging means 3. Simultaneously with this rearward movement of the fish along the trough 195 this trough is itself raised as a result of the action of the slide member 200 on the cam 197.

In this way the fish will be engaged while it is raised and moved rearwardly by the pair of arms 2 so as then to be held stationary by the latter, and once arms 2 engage the fish a further adjustment of the structure is prevented because the spring 209 will simply expand during the continued rotation of the cam 205. This spring 209 only stretches until its cam 205 reaches the position where the maximum shifting of the fish takes place. The continued turning of the cam 205 permits the head-engaging means 201 to return to the position corresponding to the largest fish, the spring 202 retracting the head-engaging means 201 into this latter position. After this operation has been completed, the cam 206 has been turned through a distance sufficient to cause the hollow shaft 198 to turn so as to tilt the head-engaging means 201 downwardly out of the path of movement of the fish which is transported by the pair of arms 2, the turning of the hollow shaft being brought about through turning of the lever 211 by the lever 212 whose pin is engaged in the camming groove of the cam 206.

Thus, a fish 6 is transported away from the structure of FIG. 17, and thereafter the cam 206 tilts the head-engaging means 201 back to its upright position.

Thus, with this latter construction the fish 6 is positioned independently of its size at such a location that it will be properly engaged by the pair of arms 2 which transport the fish to the further operating stations. The spine of the fish is directed with this structure along a line along which the fish is shifted in such a way that the gill openings thereof are always situated at a predetermined location when the fish is gripped by the pair of arms 2.

*Head and stomach removal*

In accordance with a further feature of the present invention, the removal of the head of the fish takes place simultaneously with the removal of the stomach and insides thereof, and the structure for accomplishing this result, situated at operating station II, is illustrated in FIGS. 18–21.

The pair of blades 25 and 26 at the station II are simultaneously turned through 360 degrees in opposite directions, and they include portions which cooperate to shear through the fish in a plane perpendicular to the spine thereof, as well as frusto-conical portions which cut through the fish substantially in a plane inclined to the plane which is perpendicular to the spine and extending downwardly from this latter plane beneath the spine. Thus, as may be seen from FIG. 18 the blades 25 and 26 cut through the fish along the dotted line AB in order to cut the fish just behind the head thereof in a plane normal to the spine of the fish, while the frusto-conical portions of the blades cooperate with each other to cut through the fish along the line BC which is inclined downwardly and rearwardly from the plane AB beneath the spine, this incline being downwardly and rearwardly toward the point C situated at the location where the waste parts at the inside of the fish are to be removed, so that with a single operation the stomach and insides together with the head of the fish are removed.

As is shown in FIG. 19, the rotary blade 26 carries a pocket 213 which receives the waste portions of the fish which are cut away therefrom in the single operation at station II. The configuration of the pocket 213 corresponds generally to the configuration of the portion of the fish which is cut away from the body thereof which is held by the pair of fish-engaging means 3. Furthermore, the depth of the pocket 213 is such that the parts of the fish which are cut away from the body thereof can be reliably received in this pocket and will fall to the lowest part of the pocket.

The blades 25 and 26 are preferably of sector-shaped configuration and have a common axis of rotation along which they have fixed predetermined axial positions relative to each other. The pair of oppositely rotating bevel gears 27 are respectively connected operatively to the blades 25 and 26 for rotating the latter. A shaft 220 is fixed to the right gear 27 of FIG. 19 and is also fixed to the blade 25, while a hollow shaft 221 surrounds the shaft 220 and is fixed to the left gear 27 of FIG. 19 as well as to the blade 26. The shaft 70 of course drives the gears 27 in opposed directions through the bevel gear 29 situated between and meshing with both of the gears 27.

As may be seen from FIG. 18, the blades 25 and 26 respectively have different sets of cutting edges which cooperate to cut the fish through a shearing action, and these cutting edges provide the blades with a substantially saw-toothed configuration. Thus, the blade 25 has a pair of cutting edges 214 and 215 which respectively cooperate with the cutting edges 216 and 217 of the blade 26 for cutting through the fish behind the head thereof in the plane perpendicular to the spine of the fish and extending it along the line AB, while the frusto-conical portions of the blades are respectively provided with cooperative cutting edges 218 and 219 which serve to cut the fish in the inclined plane extending along the line BC so as to cut away from the fish the stomach and insides thereof simultaneously with the beheading of the fish. The cutting edges 218 and 219 of course extend along the surfaces of a pair of cones. The cutting edge 214 has a radial distance from the common axis of the blades different from that of the cutting edge 216, and the cutting edge 215 has a different radial distance from this common axis than the cutting edge 217, so that in this way, a true shearing action is provided. With this arrangement a cutting of the fish along the line AB and a shearing of the fish along the line BC is achieved. The cutting edges 215 and 218 of the blade 25 are situated in planes which are inclined with respect to each other and the same way as the lines AB and BC, and of course the blade 26 is constructed in a corresponding manner.

These cutting edges of the blades provide the blades with a non-uniform saw-tooth configuration and the points of the saw-tooth configuration are of different lengths.

Once a fish has been placed at the operating station II, the structure operates to turn the blades 25 and 26 in opposite directions toward each other so as to engage and cut through the fish in a manner described above. At the beginning of the cutting operation the saw-tooth tips of the cutting edges simultaneously cut into the fish without any time delay between engagement of the tips of the cutting edges with the fish, so that actually the pair of blades 25 and 26 cooperate with each other to maintain the fish stationary during the beheading thereof and during the cutting away of the stomach and insides thereof.

Both of the blades 25 and 26 are simultaneously turned in opposite directions through 360 degrees in order to carry out the operation at station II. Because the fish is maintained stationary while it is simultaneously cut in opposite directions by the pair of counter rotating blades 25 and 26, there is no shifting or deformation of the flesh of the fish. FIG. 20 in particular illustrates how the fish is placed at station II extending into the gap between the cutting edges of the blades 25 and 26 in preparation for the cutting away of the waste portions of the fish at station II. The arresting and maintaining of the fish absolutely stationary is brought about by the digging in of the blades into the fish at the point B. This point B is situated directly beneath the spine of the fish. The rotating Maltese cross 56 controls the cutting operations at station II, and at this station the flesh of the fish is cleanly cut through behind the head and just through the stomach cavity eliminating most of the stomach and the insides of the fish all the way back to the anal cavity thereof situated at the point C. As is apparent from FIGS. 20 and 21, the left end of the pocket 213, as viewed in FIG. 20, is open so as to receive the part of the fish which is cut away by the blades 25 and 26; during the continued rotation of the blades to the position indicated in FIG. 21 the cut away portions of the fish will simply fall out of the pocket 213 to be received on any suitable chute conveyor or the like, so as to be disposed of in any desired manner.

Removal of filets

After the fish has been operated upon in the above manner at the operating station II, the Maltese cross 55 brings about the further transportation of the fish by the pair of arms 2 into the station III. At this point the driving motor 40, which continuously rotates the brush at station III, cleans the fish with the brush. The driving motor 40 directly drives the brush as indicated in FIGS. 3 and 4, and the rotating brush cleans the stomach cavity of the fish 6. FIG. 1 illustrates the arrangement of the brush and its supporting structure, as has already been described. During the next transporting cycle the transporting structure is again driven by the Maltese cross 55 and the pair of arms 2 carry the fish, which has been cleaned at station III, to the operation station IV where the fileting takes place.

Thus, in the fish treating apparatus of the invention there is a means for supporting a fish for movement in a predetermined path, and there is a cutting means adjacent this path for substantially simultaneously removing the head and stomach from the fish. A second means is situated further along this path for fileting the fish, and this second means comprises a pair of sector blades which rotate simultaneously to engage the fish as the fish approaches this second means, these latter blades being adapted to remove the spine and rib bones from the fish.

The manner in which the fish is fileted at station IV is indicated in FIGS. 22–26. During the fileting operation the fileting blades cut through the fish to remove the flesh thereof in planes situated on opposite sides of the spine of the fish as well as in inclined planes extending along the ribs of the fish.

In order to carry out the fileting operations of the invention a pair of fileting knives 36 are provided. These knives are situated at a predetermined fixed distance from each other and are carried by the rotary shaft 37 so as to be driven thereby. In order to cut through the fish just above the ribs thereof, the fileting blades 36 are each provided with an elongated cutting edge 222 forming the outer edge of a part of each blade 36 which forms part of a cone, and this blade 222 and the part of the blade 36 which forms part of a cone cuts through the fish just above the stomach cavity thereof. The cutting edge 222 terminates in a tip 223 which is also located at the part of the blade which forms part of a cone. These inclined parts of the blades 36 which form parts of a cone and which have the outer cutting edges 222, respectively, have their conical portions extending about a common axis which coincides with the axis of the shaft 37.

The tip 223 of the cutting edge 222 also forms the tip of an elongated arcuate cutting edge 224 extending along the outer edge of a flat planar part of each blade 36, these flat planar parts being situated in a pair of parallel planes normal to the shaft 37 and respectively defining between themselves a space in which the spine of the fish is located. As is apparent from FIG. 24, the radius of the cutting edge 224 increases away from the tip 223 thereof. Thus, the blades 36 each have a structure according to which a planar part thereof which terminates in the outer cutting edge 224 is situated at a predetermined angle with respect to the part thereof which forms part of a cone and which terminates in the outer cutting edge 222, and the angle between these parts of each blade 36 is shown most clearly in FIG. 25 from which it is apparent that the blades are capable of cutting through the fish longitudinally thereof so as to remove the filet portions and leaving only a slight amount of flesh in which the spine and rib bones are located. The fish body is supported on the stationary blocks 7 during the fileting thereof at station IV.

As is apparent from FIG. 23, the pair of tips 223 of the blades 36 make the respect to each other the angle indicated in FIG. 23 so that in this way during the initial entering of the pair of blades at their tips 223 into the flesh of the fish the spine thereof will become located in the space A between the blades. The pair of supporting blocks 7 are fixedly carried by a stationary mounting plate 38, as described above. This plate 38 is it self connected to the stationary wall 127 which forms part of the framework of the machine. The pair of blocks 7 are situated from each other also by the distance A. These supporting blocks 7 are situated within the cones of which the blade portions which terminate in the edges 222 form a part so that the supporting blocks 7 are completely out of the path of turning of the blades which turn through 360 degrees during one operating cycle.

In fact the surfaces of the blocks 7 which are engaged by the fish conform to conical configuration of the portions of the blades which terminate in the cutting edges 222. These blocks 7 are provided with toothed portions 225 which engage the fish to prevent slipping thereof. The teeth 225, as shown most clearly in FIG. 22, are inclined in a manner which opposes movement of the fish by the cutting blades 36. FIG. 24 illustrates the position of the parts just after the blades 36 have started to cut through the fish. It is to be noted that the curved edges 224 will cut rearwardly through the fish toward the tail thereof so as to separate the flesh from the bones of the fish. The fish is of course deposited on the supporting block 7 by the pair of arms 2 which hold the fish by the fish-engaging means 3 as described above. The tips 223 of the blades 36 enter into the flesh of the fish to reach the point C thereof, this point C being indicated in FIG. 18. The edge 222 of each blade separates the flesh of the fish from just above the ribs thereof, in such a way that a separation of the flesh of the fish along the cutting line EF, indicated in FIG. 25, is provided.

As a result of the configuration of the blades, a shearing away of the flesh is achieved and the cutting edges 222 pass just over the stomach cavity and the rib bones of the fish which radiate laterally and downwardly from the spine thereof, as indicated in FIG. 25 as well as FIG. 26. Because of the manner in which the cutting edges 222 spread outwardly from the tips 223, the fish flesh is sheared away without any danger of the blades cutting into the rib bones.

At the same time the cutting edges 224 of the blades cut through the flesh of the fish on opposed sides of the spine thereof, so as to cut the fish along the line DE indicated in FIG. 25. Thus, the fish is held on the blocks 7 in the manner indicated in FIG. 25 while the pair of blades 36 cut there through along the lines DEF, indicated in FIG. 25, and the fileted portions of the fish are held by the suction in the interior of the fish-engaging means 3. It is to be noted that the spine of the fish is situated directly in line with the space between the supporting blocks 7.

Of course, the relatively thin mounting plate 38 has a thickness corresponding to the distance A, and the pair of blades respectively turn along the opposed side surfaces of the supporting plate 38. The shaft 37 extends through the plate 38 so as to fixedly carry the pair of blades, and the plate 38 carries on its opposed faces suitable brackets on which the blocks 7 are mounted, as indicated in FIG. 22 which also indicates how these blocks 7 respectively form parts of cones which of course are only slightly smaller than and which are coaxial with the cones of which the blade portions which terminate in the cutting edges 222 form a part.

At the moment when the tips 223 of the blades enter into the flesh of the fish, the opening angle β formed by the angles along which the tips 223 are ground, centers and holds the fish between the blades. As a result the spine 226 of the fish becomes accurately situated between the pair of blades and in the space between the pair of blocks 7. During the continued turning of the blades through the flesh of the fish the cutting edges 222 become situated on one side of the rib bones while the blocks 7 are situated on the other side thereof. After turning of the blades through 360 degrees, the single rotation thereof has resulted in separation of the filets 227 from the remainder of the fish, and these filets are carried by the pair of fish-engaging means 3 as the arms 2 move away from the station 4 toward the station 1. When the air under pressure is supplied to the pair of fish-engaging means 3 to reliably separate the filets 227 therefrom, these filets are deposited on a suitable chute which directs them to a suitable storage portion of the vessel.

It is thus to be noted that with the invention the fish is simultaneously fileted on opposite sides of its bone structure, so that both of these filets are achieved in a single operation, and of course the beheading and the elimination of the stomach and insides of the fish also takes place in a single operation at the operating station II, as pointed out above.

Thus, it will be seen that with the structure and process of the invention it is only necessary to provide a relatively light apparatus occupying only a small amount of space and at the same time operating very efficiently at a high rate of speed to obtain from the fish immediately after the catching thereof the filet portions thereof, while the waste portions of the fish can be eliminated, and thus a very economical operation can be achieved with the invention.

What is claimed is:

1. In a fish treating apparatus, a pair of rotary blade means for cutting through a fish and each having a first portion in a first plane perpendicular to the spine of said fish and situated just behind the head thereof as well as a second portion in a second plane, inclined downwardly and rearwardly from the first plane, so that said pair of blade means will cut away from the body of the fish the head and stomach thereof, and means operatively connected to said pair of blade means for simultaneously turning the latter through 360 degrees in opposite directions through a given working stroke while said pair of blade means slidably engage each other, so that through shearing action said pair of blade means cut through the fish during the single revolution which constitutes the complete working stroke of said pair of blade means.

2. In an apparatus as recited in claim 1, each blade means having an elongated cutting edge of substantially saw-tooth configuration.

3. In an apparatus as recited in claim 1, one of said blade means carrying a hollow pocket for receiving the head and stomach of a fish which is cut away from the body thereof.

4. In a fish-fileting assembly, a pair of rotary fileting blade means respectively forming mirror-images of each other and respectively defining between themselves a space for accommodating the spine and ribs of a fish, means operatively connected to said pair of blade means for rotating the latter about a common axis through 360 degrees, and support means for supporting a fish with its spine and ribs situated in said space defined between said pair of blade means, so that while said pair of blade means rotate together through 360 degrees about said common axis, the fish will be fileted while the portion thereof remaining on said support means will include the spine and ribs, said support means including a thin supporting plate situated in said space between said pair of blade means during at least part of the rotation thereof and said pair of blade means respectively including a pair of first blade portions parallel to said plate.

5. In an apparatus as recited in claim 4, a block carried by said plate and situated in a space about which said blades turn.

6. In an apparatus as recited in claim 5, said pair of blade means respectively including a pair of second blade portions respectively forming parts of cones and projecting laterally away from said pair of first blade portions at inner edges thereof which are adjacent said common axis, so that said second blade portions cut through the meat of the fish adjacent to the ribs thereof.

7. In an apparatus as recited in claim 6, both of said blade portions of each blade means together defining a sharp point at a leading end of each blade means to facilitate entry of the blade means into the body of a fish on said support means.

8. In a fish treating apparatus, means for supporting a fish for movement in a predetermined path, cutting means adjacent said path for substantially simultaneously removing the head and stomach from the fish, and second means further along said path for fileting said fish and comprising a pair of sector blades simultaneously rotating to engage said fish as the fish approaches said second means, said blades being adapted to remove the spine and rib bones from the fish.

References Cited

UNITED STATES PATENTS

| 2,110,416 | 3/1938 | David et al. | 17—4 |
| 2,353,654 | 7/1944 | Danielsson | 17—4 X |
| 2,423,174 | 7/1947 | Brown | 17—4 |
| 2,479,010 | 8/1949 | Jones | 17—4 |
| 3,082,094 | 3/1963 | Kramer | 17—45 |
| 3,139,648 | 7/1964 | Rice | 17—3 |

LUCIE H. LAUDENSLAGER, *Primary Examiner.*